(12) United States Patent
Park et al.

(10) Patent No.: US 12,743,612 B2
(45) Date of Patent: Sep. 22, 2026

(54) QUANTIZATION METHOD OF ARTIFICIAL NEURAL NETWORK AND OPERATION METHOD USING ARTIFICIAL NEURAL NETWORK

(71) Applicant: Samsung Electronics Co., Ltd., Suwon-si (KR)

(72) Inventors: Juhee Park, Gwacheon-si (KR); Kyoungyoung Kim, Suwon-si (KR); Sanghyuck Ha, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 913 days.

(21) Appl. No.: 17/014,158

(22) Filed: Sep. 8, 2020

(65) Prior Publication Data

US 2021/0089898 A1 Mar. 25, 2021

(30) Foreign Application Priority Data

Sep. 24, 2019 (KR) ........................ 10-2019-0117485
Mar. 10, 2020 (KR) ........................ 10-2020-0029807

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC ............ G06N 3/08; G06N 3/04; G06N 3/063; G06N 20/00; G06N 3/045; G06F 18/00
See application file for complete search history.

(56) References Cited

U.S. PATENT DOCUMENTS 9,916,531 B1 3/2018 Zivkovic et al.
10,325,370 B1 6/2019 Jabari et al.
(Continued)

FOREIGN PATENT DOCUMENTS

CN 106909970 A 6/2017
CN 108491926 A 9/2018
(Continued)

OTHER PUBLICATIONS

S. Jain, S. Venkataramani, V. Srinivasan, J. Choi, P. Chuang and L. Chang, "Compensated-DNN: Energy Efficient Low-Precision Deep Neural Networks by Compensating Quantization Errors," 2018 55th ACM/ESDA/IEEE Design Automation Conference (DAC), San Francisco, CA, USA, 2018, pp. 1-6, doi Doi: 10.1109/DAC.2018.8465893.*

(Continued)

*Primary Examiner* — Markus A. Vasquez
(74) *Attorney, Agent, or Firm* — Harness, Dickey & Pierce, P.L.C.

(57) ABSTRACT

The computing system includes a neural network system configured to drive an artificial neural network (ANN); and a quantization system configured to quantize the ANN, wherein the quantization system is further configured to quantize parameters of the ANN to generate the quantized parameters of the ANN, generate a quantization error of the parameters of the ANN based on the parameters of the ANN and the quantized parameters, generate a compensation bias based on the quantized parameters and the quantization error of the parameters of the ANN, and transmit the generated quantized parameters and the compensation bias to the neural network system.

19 Claims, 17 Drawing Sheets

(56) References Cited

U.S. PATENT DOCUMENTS

| | | | | |
|---|---|---|---|---|
| 2018/0285736 | A1 | 10/2018 | Baum et al. | |
| 2019/0012559 | A1 | 1/2019 | Desappan et al. | |
| 2019/0042935 | A1 | 2/2019 | Deisher | |
| 2019/0042945 | A1 | 2/2019 | Majumdar et al. | |
| 2019/0042948 | A1 * | 2/2019 | Lee | G06N 3/063 |
| 2019/0050710 | A1 | 2/2019 | Wang et al. | |
| 2019/0138882 | A1 | 5/2019 | Choi et al. | |
| 2019/0147322 | A1 | 5/2019 | Kim et al. | |
| 2019/0251442 | A1 | 8/2019 | Koivisto et al. | |
| 2019/0294413 | A1 * | 9/2019 | Vantrease | G06F 7/5095 |
| 2021/0374510 | A1 * | 12/2021 | Liu | G06N 3/045 |

FOREIGN PATENT DOCUMENTS

| | | | | | |
|---|---|---|---|---|---|
| CN | 109784470 | A | | 5/2019 | |
| CN | 107396124 | B | * | 9/2019 | G06N 3/0454 |
| EP | 3376400 | A | | 9/2018 | |
| KR | 10-2018-0043172 | A | | 4/2018 | |
| WO | WO-2016/182671 | A1 | | 11/2016 | |

OTHER PUBLICATIONS

Jacob, Benoit et al. "Quantization and Training of Neural Networks for Efficient Integer-Arithmetic-Only Inference." arXiv:1712.05877v1 [cs.LG] Dec. 15, 2017, Google Inc.

Lin, Darryl D. et al. "Fixed Point Quantization of Deep Convolutional Networks." arXiv:1511.06393v3 [cs.LG] Jun. 2, 2016.

Proakis, John G. and Masoud Salehi. "Communications Systems Engineering." 2nd Ed., New Jersey: Prentice Hall, 1994.

Request for the submission of an Opinion issued Oct. 28, 2024 in Korean Application No. 10-2020-0029807.

First Office Action issued Apr. 1, 2025 in Chinese Application No. 202011016489.3.

Notice of Allowance issued Nov. 3, 2025 in Chinese Application No. 202011016489.3.

* cited by examiner

QUANTIZATION METHOD OF ARTIFICIAL NEURAL NETWORK AND OPERATION METHOD USING ARTIFICIAL NEURAL NETWORK

CROSS-REFERENCE TO RELATED APPLICATIONS

This application claims the benefit of Korean Patent Application Nos. 10-2019-0117485 and 10-2020-0029807, filed on Sep. 24, 2019 and Mar. 10, 2020, in the Korean Intellectual Property Office, the disclosures of which are incorporated herein in their entireties by reference.

BACKGROUND

The inventive concepts relate to a quantization method of an artificial neural network and an operation method performed using the artificial neural network, and more particularly, to a quantization method of an artificial neural network and an operation method performed using the artificial neural network, wherein an expected value of an error occurring in a quantization process is generated as a compensation bias and the generated compensation bias is reflected to an operation result through a quantized artificial neural network.

An artificial neural network may refer to a computing device or a method performed by a computing device to generate interconnected sets of artificial neurons (or neuronal models). An artificial neuron may generate output data by performing simple operations on input data, and the output data may be transferred to another artificial neuron. As an example of an artificial neural network, a deep neural network or deep learning may have a multi-layer structure.

SUMMARY

The inventive concepts provide a quantization method of an artificial neural network and an operation method using the artificial neural network wherein an expected value of an error occurring in a quantization process is generated as a compensation bias and the generated compensation bias is reflected to an operation result through a quantized artificial neural network.

According to an aspect of the inventive concepts, there is provided a computing system including a neural network system configured to drive an artificial neural network (ANN); and a quantization system configured to quantize the ANN, wherein the quantization system is further configured to quantize parameters of the ANN to generate the quantized parameters of the ANN, generate a quantization error of the parameters of the ANN based on the parameters of the ANN and the quantized parameters, generate a compensation bias based on the quantized parameters and the quantization error of the parameters of the ANN, and transmit the generated quantized parameters and the compensation bias to the neural network system.

According to another aspect of the inventive concepts, there is provided an operation method using an artificial neural network (ANN) including quantizing a weight and a bias of the ANN; generating a compensation bias by compensating the quantized bias to include an error due to quantization; quantizing an input sample; performing a first multiply-accumulate (MAC) operation based on the quantized weight of the ANN and the quantized input sample; and reflecting the compensation bias to a result of the first MAC operation.

According to another aspect of the inventive concepts, there is provided a quantization method of an artificial neural network (ANN) including quantizing parameters of the ANN; computing a quantization error of the parameters based on the parameters of the ANN and the quantized parameters; and generating a compensation bias based on the quantized parameters and the quantization error of the parameters.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Figure 1:
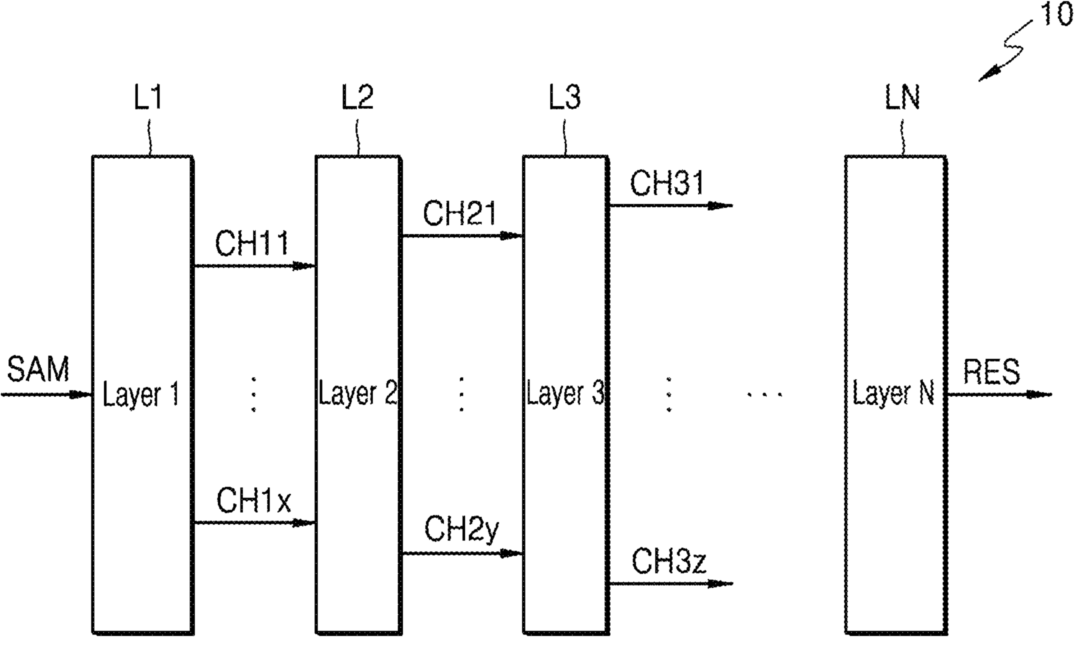
FIG. 1 is a view showing an artificial neural network according to example embodiments.

FIG. 1 is a view showing an artificial neural network (ANN) according to example embodiments. For example, FIG. 1 is a diagram schematically showing the structure of a deep neural network 10 as an example of the ANN according to example embodiments.

ANN may refer to a computing system focused on a biological neural network constituting an animal brain. ANN may be trained to perform tasks by considering multiple samples (or examples), unlike classical algorithms that perform tasks according to predefined conditions, such as rule-based programming. ANN may have a structure in which artificial neurons (or neurons) are connected, and a connection between neurons may be referred to as a synapse. A neuron may process received signals and transmit the processed signals to another neuron through the synapse. The output of the neuron may be referred to as "activation". The neuron and/or synapse may have a variable weight, and the influence of the signal processed by the neuron may increase or decrease depending on the weight. In particular, the weight associated with an individual neuron may be referred to as a bias.

A deep neural network (DNN) or a deep learning architecture may have a layer structure, and output of a specific layer may be an input of a subsequent layer. In such a multi-layered structure, each of the layers may be trained according to multiple samples. Artificial neural networks, such as DNN may be implemented by a number of processing nodes corresponding to artificial neurons respectively, which may require higher computational complexity so as to obtain good results, such as higher accuracy results, and, accordingly, many computing resources may be required.

Referring to FIG. 1, a DNN 10 may include a plurality of layers L1, L2, L3, . . . , LN, and the output of a layer may be input to a subsequent layer through at least one channel. For example, the first layer L1 may provide an output to the second layer L2 through a plurality of channels CH11 . . . CH1*x* by processing a sample SAM, and the second layer L2 may also provide an output to the third layer L3 through a plurality of channels CH21 . . . CH2*y*. Finally, the Nth layer LN may output a result RES, and the result RES may include at least one value related to the sample SAM. The number of channels through which the outputs of the plurality of layers L1, L2, L3, . . . , LN are transferred may be the same or different. For example, the number of channels CH21 . . . CH2*y* of the second layer L2 and the number of channels CH31 . . . CH3*z* of the third rater L3 may be the same or different.

The sample SAM may be input data processed by the DNN 10. For example, the sample SAM may be an image including a letter written by a person, and the DNN 10 may output the result RES including a value representing the letter by recognizing the letter from the image. The result RES may include a plurality of probabilities corresponding to different letters, and the most influential letter among the different letters may correspond to the highest probability. Each of the plurality of layers L1, L2, L3, . . . , LN of the DNN 10 may generate its own outputs by processing the sample SAM and the output of a previous layer based on values generated by learning a plurality of images including letters, such as weight, bias, etc.

The DNN 10 may include a large number of layers or channels according to example embodiments, and accordingly, the computational complexity of the DNN 10 may increase. The DNN 10 with high computational complexity may require a lot of resources. Therefore, in order to reduce the computational complexity of the DNN 10, the DNN 10 may be quantized. Quantization of the DNN 10 may refer to a process of mapping input values to a number of values smaller than the number of the input values, such as mapping a real number to an integer through rounding. The quantized DNN 10 may have low computational complexity, but may have reduced accuracy due to an error occurring in the quantization process.

As described below with reference to the following drawings, the quantized DNN 10 according to example embodiments may reflect an expected value of the error occurring in the quantization process to an operation result, and thus the DNN 10 may have improved performance and/or reduced complexity.

Figure 2:
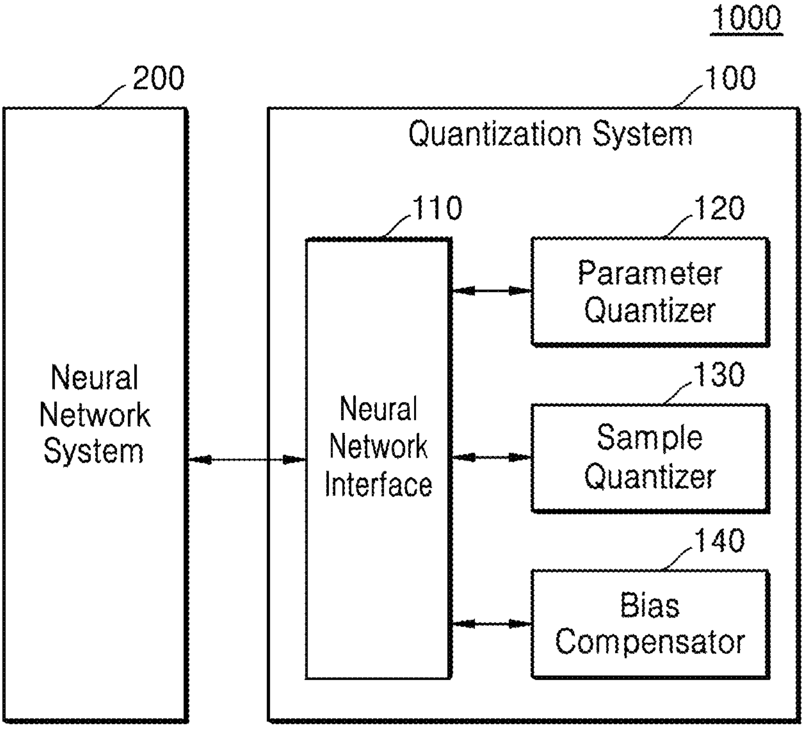
FIG. 2 is a diagram illustrating a computing system according to example embodiments.

FIG. 2 is a diagram illustrating a computing system 1000 according to example embodiments.

Referring to FIG. 2, the computing system 1000 may include a quantization system 100 and a neural network system 200. The neural network system 200 may provide an ANN, and the quantization system 100 may quantize the ANN provided from the neural network system 200, and provide the at least partially quantized ANN to the neural network system 200. In FIG. 1, the neural network system 200 and the quantization system 100 are separate from each other, but according to example embodiments, the neural network system 200 and the quantization system 100 may be implemented as one system.

The neural network system 200 may be any system that provides (or drives) the ANN, and may also be referred to as a neural network device. For example, the neural network system 200 may be implemented in processing circuitry, for example, a computing system including at least one processor and memory. As a non-limiting example, the neural network system 200 may be a stationary computing system such as a desktop computer, a server, etc., as well as a mobile computing system such as a laptop computer, a smart phone, etc.

In example embodiments, the neural network system 200 may drive the ANN, and provide information about the ANN to the quantization system 100. In example embodiments, the neural network system 200 may drive the ANN according to the information provided from the quantization system 100, and provide the information about the driven ANN to the quantization system 100.

The quantization system 100 may be any system that performs quantization of the ANN, and may also be referred to as a quantization device. For example, the quantization system 100 may be implemented in processing circuitry, for example, a computing system including at least one processor and memory. The quantization system 100 may be a stationary computing system or a mobile computing system. The quantization system 100 may quantize the ANN based on the information of the ANN provided from the neural network system 200.

Referring to FIG. 2, the quantization system 100 may include a neural network interface 110, a parameter quantizer 120, a sample quantizer 130 and/or a bias compensator 140. In example embodiments, each of the neural network interface 110, the parameter quantizer 120, the sample quantizer 130, and the bias compensator 140 may be implemented in processing circuitry, for example, as a logic block implemented through logic synthesis, a software block performed by a processor, or a combination thereof. In example embodiments, each of the neural network interface 110, the parameter quantizer 120, the sample quantizer 130 and the bias compensator 140 may be a procedure as a set of a plurality of instructions executed by the processor, and may be stored in an accessible memory by the processor.

The neural network interface 110 may provide an interface regarding the neural network system 200 to the parameter quantizer 120 and the sample quantizer 130. For example, the neural network interface 110 may provide parameters of the ANN received from the neural network system 200 to the parameter quantizer 120, and provide quantized parameters received from the parameter quantizer 120 to the neural network system 200. Also, the neural network interface 110 may provide samples received from the neural network system 200 to the sample quantizer 130, and provide quantized samples received from the sample quantizer 130 to the neural network system 200. In addition, the neural network interface 110 may provide a compensation bias received from the bias compensator 140 to the neural network system 200.

The parameter quantizer 120 may generate quantized parameters from the parameters received from the neural network system 200 through the neural network interface 110. For example, the parameter quantizer 120 may receive a weight and a bias as the parameters of the ANN, and generate a quantized weight and a quantized bias. The parameter quantizer 120 may provide the quantized weight to the neural network system 200 through the neural network interface 110.

In addition, the parameter quantizer 120 may generate a quantization error of the weight and a quantization error of the bias using the quantized weight and the quantized bias. The quantization error of the weight may include an error occurring in a process of quantizing the weight of the ANN. By using the characteristic that a non-quantized weight is equal to the sum of the quantized weight and the quantization error of the weight, the parameter quantizer 120 may generate the quantization error of the weight from the received weight and the quantized weight. In addition, the quantization error of the bias may include an error occurring in a process of quantizing the bias of the ANN. By using the characteristic that a non-quantized bias is equal to the sum of the quantized bias and the quantization error of the bias, the parameter quantizer 120 may generate the quantization error of the bias from the received bias and the quantized bias.

In addition, the parameter quantizer 120 may provide the bias compensator 140 with information used to generate the compensation bias for compensating for an error due to quantization. For example, the parameter quantizer 120 may provide the quantized weight, the quantized bias, the quantization error of the weight, and the quantization error of the bias to the bias compensator 140.

The sample quantizer 130 may generate quantized samples from samples received from the neural network system 200 through the neural network interface 110. For example, the sample quantizer 130 may receive a plurality of images, voice data, etc., and generate quantized images, quantized voice data, etc. The sample quantizer 130 may provide the quantized samples to the neural network system 200 through the neural network interface 110. Because parameters and samples have different characteristics in the ANN, quantization of the parameters and quantization of the samples may be separated.

The bias compensator 140 may generate the compensation bias for compensating for the error due to quantization using information received from the parameter quantizer 120. In example embodiments, the bias compensator 140 may generate the compensation bias by compensating for the quantized bias to include the error due to quantization. Examples of the operation of the bias compensator 140 of generate the compensation bias will be described below with reference to FIGS. 6 and 7. The bias compensator 140 may provide the generated compensation bias to the neural network system 200 through the neural network interface 110.

The neural network system 200 may perform a multiply-accumulate (MAC) operation based on the quantized weight received from the parameter quantizer 120 and the quantized sample received from the sample quantizer 130. In addition, the neural network system 200 may generate a final operation result by reflecting the compensation bias received from the bias compensator 140 to a MAC operation result.

Figure 3:
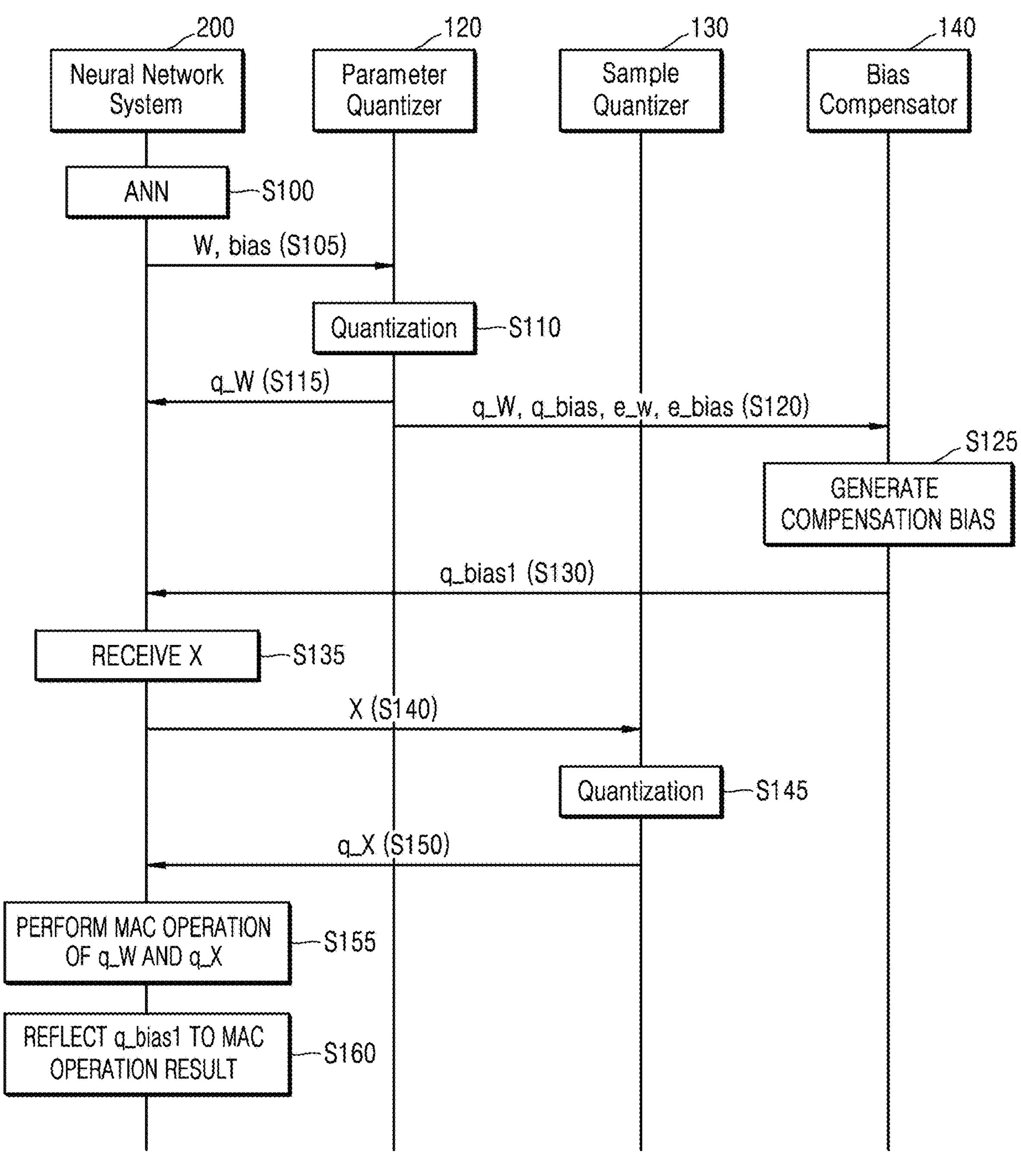
FIG. 3 is a flowchart illustrating operations of a neural network system, parameter quantizer, a sample quantizer, and a bias compensator according to example embodiments.

FIG. 3 is a flowchart illustrating operations of the neural network system 200, the parameter quantizer 120, the sample quantizer 130, and the bias compensator 140 according to example embodiments. For example, FIG. 3 is the flowchart illustrating a quantization operation of an ANN of the neural network system 200, the parameter quantizer 120, the sample quantizer 130, and the bias compensator 140 of FIG. 2 and an operation using a quantized ANN.

Referring to FIGS. 2 and 3, the neural network system 200 may include the ANN (S100). In addition, the neural network system 200 may provide a weight W and a bias to the parameter quantizer 120 as parameters of the ANN along with a quantization request (S105). In addition, the parameter quantizer 120 may quantize the received weight W and bias (S110). In addition, the parameter quantizer 120 may provide a quantized weight q_W to the neural network system 200 (S110). The neural network system 200 may store the received quantized weight q_W. In addition, the parameter quantizer 120 may provide the quantized weight q_W, a quantized bias q_bias, a quantization error e_W of the weight, and a quantization error e_bias of the bias to the bias compensator 140 (S120). The operation order of operations S110 and S120 may be changed.

In addition, the bias compensator 140 may generate a compensation bias for compensating for an error due to quantization based on the received information (S125). For example, the bias compensator 140 may generate the compensation bias based on the received quantized weight q_W, quantized bias q_bias, quantization error e_W of the weight, and quantization error e_bias of the bias. Examples of the operation of the bias compensator 140 of generate the compensation bias will be described below with reference to FIGS. 6 and 7. In addition, the bias compensator 140 may provide a generated compensation bias q_bias1 to the neural network system 200 (S130). The neural network system 200 may store the received compensation bias q_bias1.

The neural network system 200 may receive a new sample X (S135). Then, the neural network system 200 may provide the sample X to the sample quantizer 130 along with a quantization request (S140). In addition, the sample quantizer 130 may quantize the received sample X (S145). In addition, the sample quantizer 130 may provide a quantized sample q_X to the neural network system 200 (S150). The neural network system 200 may perform a MAC operation based on the quantized weight q_W and the quantized sample q_X (S155). In addition, the neural network system 200 may generate a final operation result by reflecting the compensation bias q_bias1 to a MAC operation result (S160).

Figure 4:
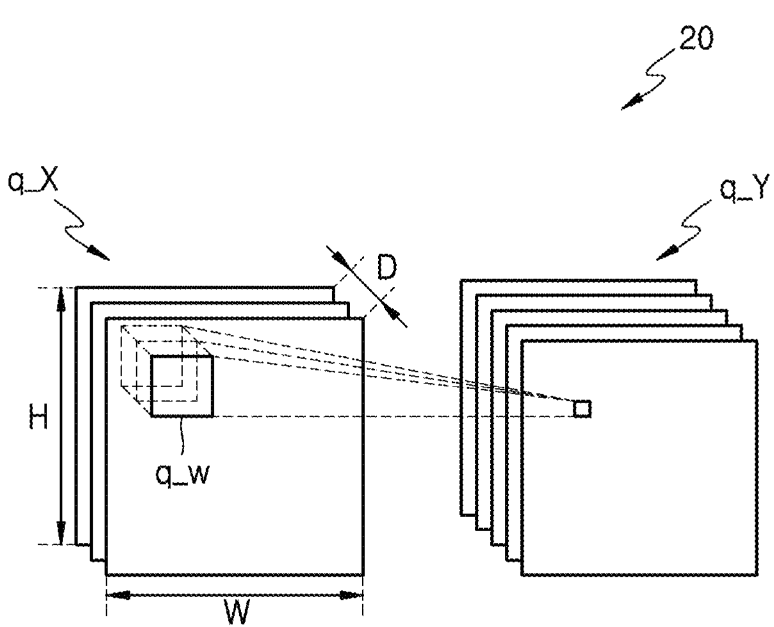
FIG. 4 is a diagram for explaining the architecture of a computational graph according to example embodiments.

FIG. 4 is a diagram for explaining the architecture of a computational graph 20 according to example embodiments.

Referring to FIG. 4, the computational graph 20 is a graph showing a mathematical model expressed using nodes and edges. The architecture of the computational graph 20 may correspond to the architecture of an ANN or a quantized ANN. For example, the ANN or the quantized ANN may be implemented as a convolution neural network (CNN), but the inventive concepts are not limited thereto. When the quantized ANN of FIG. 4 expresses the CNN, the computational graph 20 may correspond to some layers of the CNN. For example, the computational graph 20 may correspond to one layer of the CNN that performs a MAC operation, such as a convolution layer, a fully connected layer, etc. Hereinafter, for convenience of description, a description will be given of a method performed by the neural network system 200 of FIG. 2 of performing the MAC operation using a quantized weight and a quantized sample on the premise that the computational graph 20 is the convolution layer.

Referring to FIGS. 2 and 4, the neural network system 200 may provide the weight W of the ANN to the parameter quantizer 120 along with a quantization request, and receive the quantized weight q_W from the parameter quantizer 120. In addition, the neural network system 200 may provide the received input sample X to the parameter quantizer 120 along with the quantization request, and receive the quantized input sample q_X from the parameter quantizer 120. Then, the neural network system 200 may perform the MAC operation based on the quantized weight q_W and the quantized input sample q_X, and reflect a bias (not shown) to a MAC operation result to generate a quantized output sample q_Y.

The quantized input sample q_X and the quantized output sample q_Y may be two-dimensional or higher-dimensional matrices, and may have respective activation parameters. If the quantized input sample q_X and the quantized output sample q_Y correspond to, for example, three-dimensional matrices, the quantized input sample q_X and the quantized output sample q_Y may have a width W (or a column), a height H (or a row) and a depth D. In some example embodiments, the depth D may be referred to as the number of channels.

In the convolution layer, a convolution operation may be performed on the quantized input sample q_X and the quantized weight q_W, and as a result, the quantized output sample q_Y may be generated. The quantized weight q_W may filter the quantized input sample q_X, and may be referred to as a filter or a kernel. The quantized weight q_W may have a kernel size K (that is, the size of the weight), and the depth of the quantized weight q_W, that is, the number of channels of the quantized weight q_W, may be the same as the depth D of quantized input sample q_X. The quantized weight q_W may be shifted by traversing the quantized input sample q_X as a sliding window. During each shift, each of weights included in the quantized weight q_W may be multiplied and added to all values in a region overlapping the quantized input sample q_X. As the quantized input sample q_X and the quantized weight q_W are convolved, one channel of the quantized output sample q_Y may be generated. Although one quantized weight q_W is shown in FIG. 1, substantially, a plurality of quantized weights q_W and the quantized input sample q_X may be convolved such that a plurality of channels of the quantized output sample q_Y may be generated.

Performing the MAC operation using the quantized ANN and the quantized input may cause an error compared to example embodiments performing the MAC operation using a non-quantized ANN and a non-quantized input.

For example, the operation of the ANN may be expressed as the following equation.

$$y=\sum_{c,k\in C,K}\{(q_{w_{c,k}}+e_{w_{c,k}})(q_{x_{c,k}}+e_{x_{c,k}})\}+q_{bias}+e_{bias} \quad \text{[Equation 1]}$$

$$=\sum_{c,k\in C,K}\{q_{w_{c,k}}q_{x_{c,k}}+q_{w_{c,k}}e_{x_{c,k}}+e_{w_{c,k}}q_{x_{c,k}}+e_{w_{c,k}}e_{x_{c,k}}\}+q_{bias}+e_{bias}$$

-continued $$=\underbrace{\sum_{c,k\in C,K}\{q_{w_{c,k}}q_{x_{c,k}}\}+q_{bias}}_{①}+\underbrace{\sum_{c,k\in C,K}\{q_{w_{c,k}}e_{x_{c,k}}+e_{w_{c,k}}q_{x_{c,k}}+e_{w_{c,k}}e_{x_{c,k}}\}+e_{bias}}_{②}$$

(C is the number of channels of the input, K is a kernel size, $q_{w\ c,k}$ is the quantized weight w, $e_{w\ c,k}$ is a quantization error of the weight W, $q_{bias}$ is a quantized bias, is a quantization error of the bias, $q_{x\ c,k}$ is quantized input sample X, and $e_{x\ c,k}$ is a quantization error of the input sample X)

The operation of the ANN may be divided into a quantized operation (①) and a quantization error (②). The neural network system 200 of the related art focused on implementing the quantized operation (①) optimized to reduce the quantization errors of the weight W and the input sample X, without direct consideration of the quantization error (②) (that is, without reflection of the quantization error (②) to the operation of the ANN). The neural network system 200 according to example embodiments may compute an expected value of the quantization error (②) and reflect the computed expected value to the quantized operation (①), thereby increasing the accuracy of the quantized ANN.

In FIG. 4, for convenience of description, the operation in one layer of the ANN is illustrated and described, but the operation of the ANN according to the technical idea of the inventive concepts may be substantially applied to each of a plurality of layers constituting the ANN in the same manner.

Figure 5:
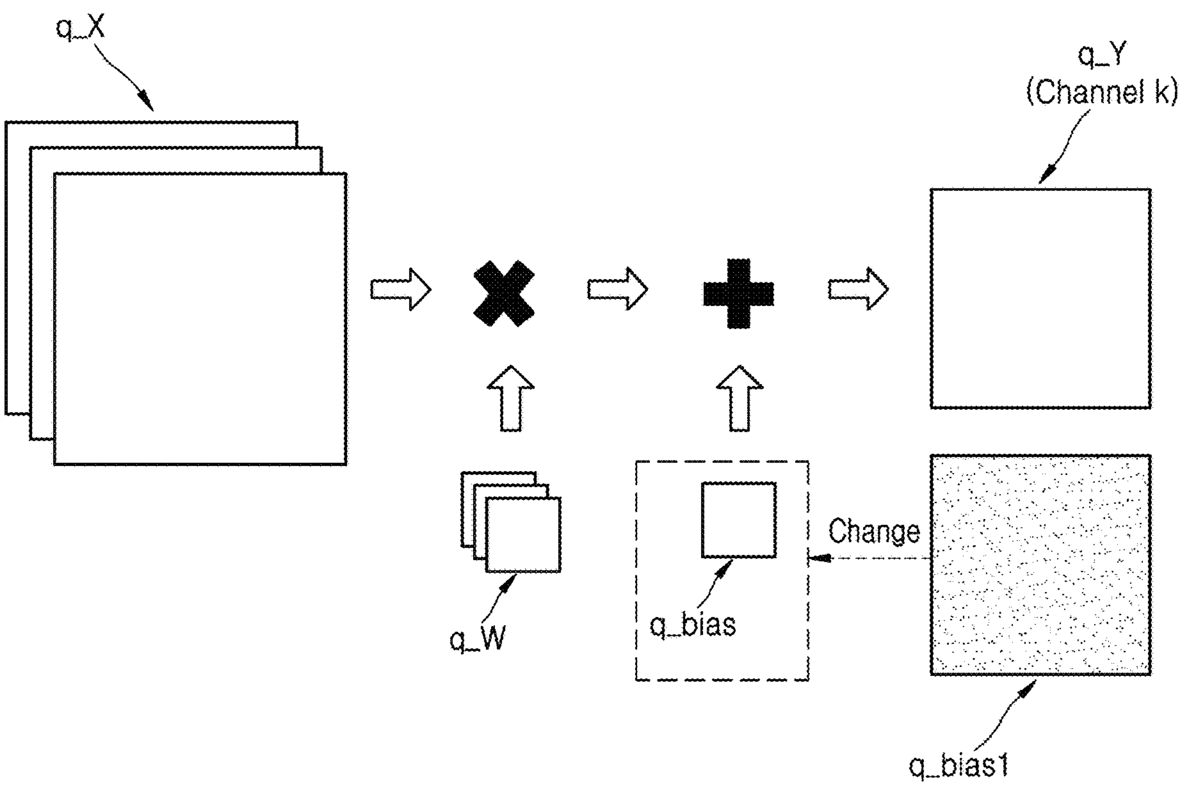
FIG. 5 is a diagram illustrating an operation of reflecting an expected value of a quantization error of a neural network system to a quantized operation according to example embodiments.

FIG. 5 is a diagram illustrating an operation of reflecting an expected value of a quantization error of the neural network system 200 to a quantized operation according to example embodiments.

Referring to FIGS. 2, 4 and 5, the neural network system 200 according to example embodiments may perform a MAC operation based on the quantized input sample q_X and the quantized weight q_W received from the quantization system 100. In addition, the neural network system 200 may generate the quantized output sample q_Y by reflecting the compensation bias q_bias1 generated by the bias compensator 140 of the quantization system 100 to a MAC operation result, instead of the quantized bias q_bias obtained by simply quantizing a bias of an ANN. The compensation bias q_bias1 may have the same size as that of the MAC operation result, as described later in FIGS. 6 and 7. Therefore, the compensation bias q_bias1 may be added to all values in a region overlapping the MAC operation result. In FIG. 5, the quantized output sample q_Y is indicated with respect to an arbitrary channel k, but the quantized output sample q_Y for each channel may be substantially generated.

The bias compensator 140 may generate the compensation bias q_bias1 including the quantization error as well as the quantized bias q_bias of the ANN. Specifically, the bias compensator 140 may generate the compensation bias q_bias1 to include a formula of ③ in a quantization operation equation of the ANN below.

$$y = \sum_{c,k \in C,K} \{q_{w_{c,k}} q_{x_{c,k}}\} + \underbrace{q_{bias} + \sum_{c,k \in C,K} \{q_{w_{c,k}} e_{x_{c,k}} + e_{w_{c,k}} q_{x_{c,k}} + e_{w_{c,k}} e_{x_{c,k}}\} + e_{bias}}_{③} \approx \sum_{c,k \in C,K} \{q_{w_{c,k}} q_{x_{c,k}}\} + qbias1 \quad \text{[Equation 2]}$$

In the above quantization operation equation of the ANN, $q_{bias}$, $e_{bias}$, $q_{w_{c,k}}$, and $e_{w_{c,k}}$ are values that are previously known by performing quantization of the ANN of the sample quantizer 130. However, $q_{x_{c,k}}$ and $e_{x_{c,k}}$ are values that are previously unknown at the time of performing operation processing on the input sample X. Accordingly, the bias compensator 140 may generate the compensation bias q_bias1 using $q_{x_{c,k}}$ and $e_{x_{c,k}}$ of a reference sample X' that replaces the actual input sample X, rather than $q_{x_{c,k}}$ and $e_{x_{c,k}}$ with respect to the actual input sample X.

For example, the sample quantizer 130 may generate a plurality of quantized samples and quantization errors of the plurality of samples by quantizing a plurality of samples selected from a sample pool. The bias compensator 140 may generate $q_{x_{c,k}}$ using the plurality of quantized samples, and may generate $e_{x_{c,k}}$ using the quantization errors of the plurality of samples. In addition, the bias compensator 140 may generate the compensation bias q_bias1 using $q_{x_{c,k}}$ and $e_{x_{c,k}}$. A specific operation of generating the compensation bias q_bias1 using the plurality of samples will be described later with reference to FIG. 9.

As another example, the bias compensator 140 may generate $q_{x_{c,k}}$ of an input sample of a next order that is expected using the input samples already processed through the ANN, and generate $e_{x_{c,k}}$ of the input sample of the next order using quantization errors of the already processed input samples. In addition, the bias compensator 140 may generate the compensation bias q_bias1 using $q_{x_{c,k}}$ and $e_{x_{c,k}}$. The specific operation of generating the compensation bias q_bias1 using the already processed input samples will be described later with reference to FIGS. 10 to 14.

Figure 6:
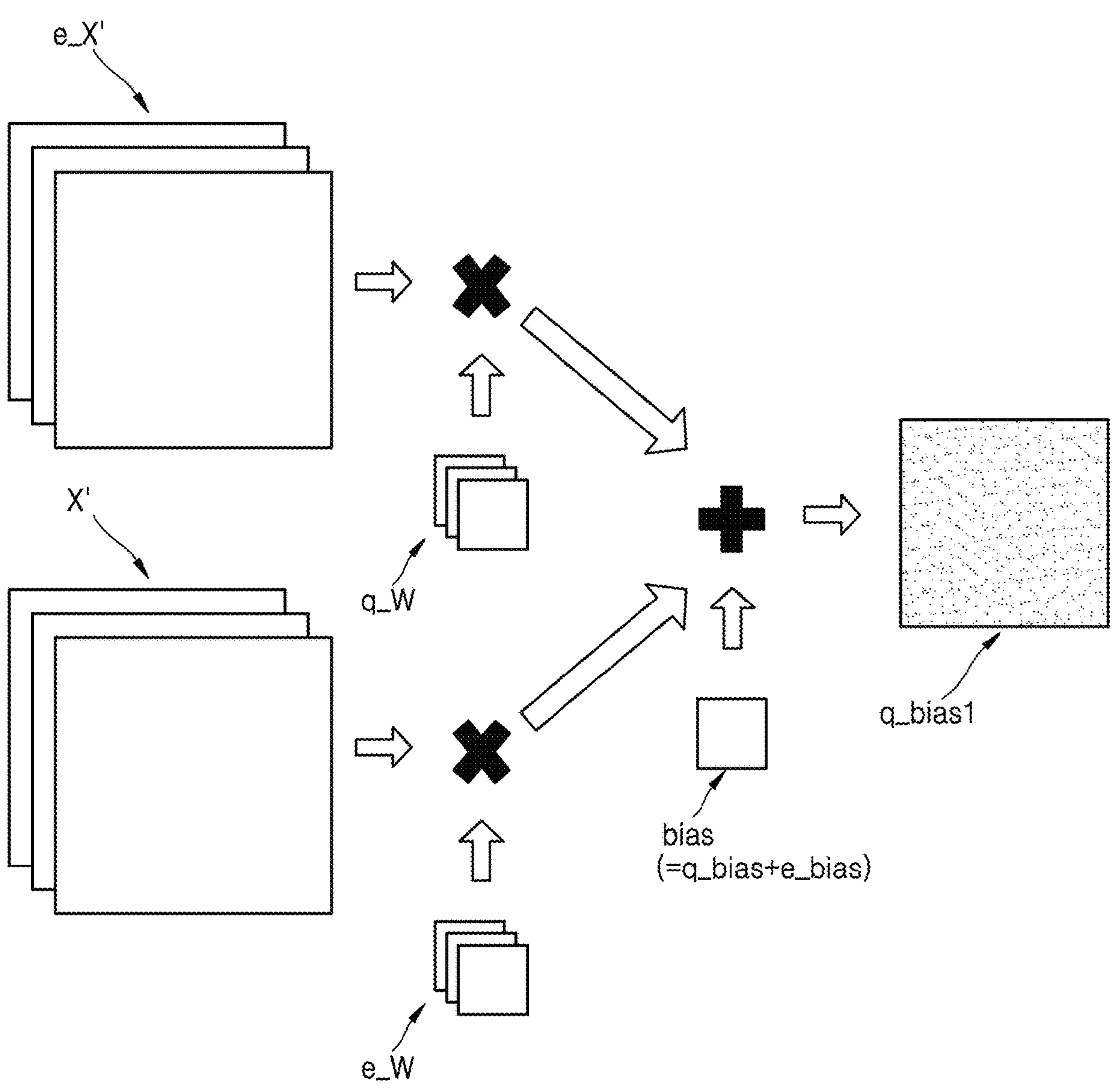
FIG. 6 is a diagram illustrating a method of generating a compensation bias according to example embodiments.

FIG. 6 is a diagram illustrating a method of generating the compensation bias q_bias1 according to example embodiments. For example, FIG. 6 is a diagram illustrating the method of generating the compensation bias including a quantized bias and a quantization error of an ANN.

The operation of the compensation bias may be expressed as the following equation.

$$\begin{aligned} q_{bias_{new}} &= \left\{q_{bias} + E\left[\sum_{c,k \in C,K} \{q_{w_{c,k}} e_{x_{c,k}} + e_{w_{c,k}} q_{x_{c,k}} + e_{w_{c,k}} e_{x_{c,k}}\} + e_{bias}\right]\right\} = \left\{q_{bias} + E\left[\sum_{c,k \in C,K} \{q_{w_{c,k}} e_{x_{c,k}} + e_{w_{c,k}} (q_{x_{c,k}} + e_{x_{c,k}})\} + e_{bias}\right]\right\} \\ &= \left\{q_{bias} + E\left[\sum_{c,k \in C,K} \{q_{w_{c,k}} e_{x_{c,k}} + e_{w_{c,k}} x_{c,k}\} + e_{bias}\right]\right\} \\ &= \left\{\text{bias} + E\left[\sum_{c,k \in C,K} \{q_{w_{c,k}} e_{x_{c,k}} + e_{w_{c,k}} x_{c,k}\}\right]\right\} \end{aligned} \quad \text{[Equation 3]}$$

(E is an Expected Value)

In the last equation above, $x_{c,k}$ may denote the reference sample X' rather than the actual input sample X, and $e_{x_{c,k}}$ may be generated using the reference sample X'. A method of determining the reference sample X' and a method of computing the quantization error $e_{x_{c,k}}$ of the reference sample X' will be described later in FIGS. 9 and 13.

Referring to FIG. 6, the last equation above may be implemented by the operation of the bias compensator 140. The bias compensator 140 may perform a first MAC operation based on a quantization error e_X' of the reference sample X' and the quantized weight q_W. In addition, the bias compensator 140 may perform a second MAC operation based on the reference sample X' and the quantization error e_W of a weight. Then, the bias compensator 140 may add a first MAC operation result, a second MAC operation result, and the bias of the ANN (that is the same as the sum of the quantized bias q_bias and the quantization error q_bias of the bias) to generate the compensation bias q_bias1.

Figure 7:
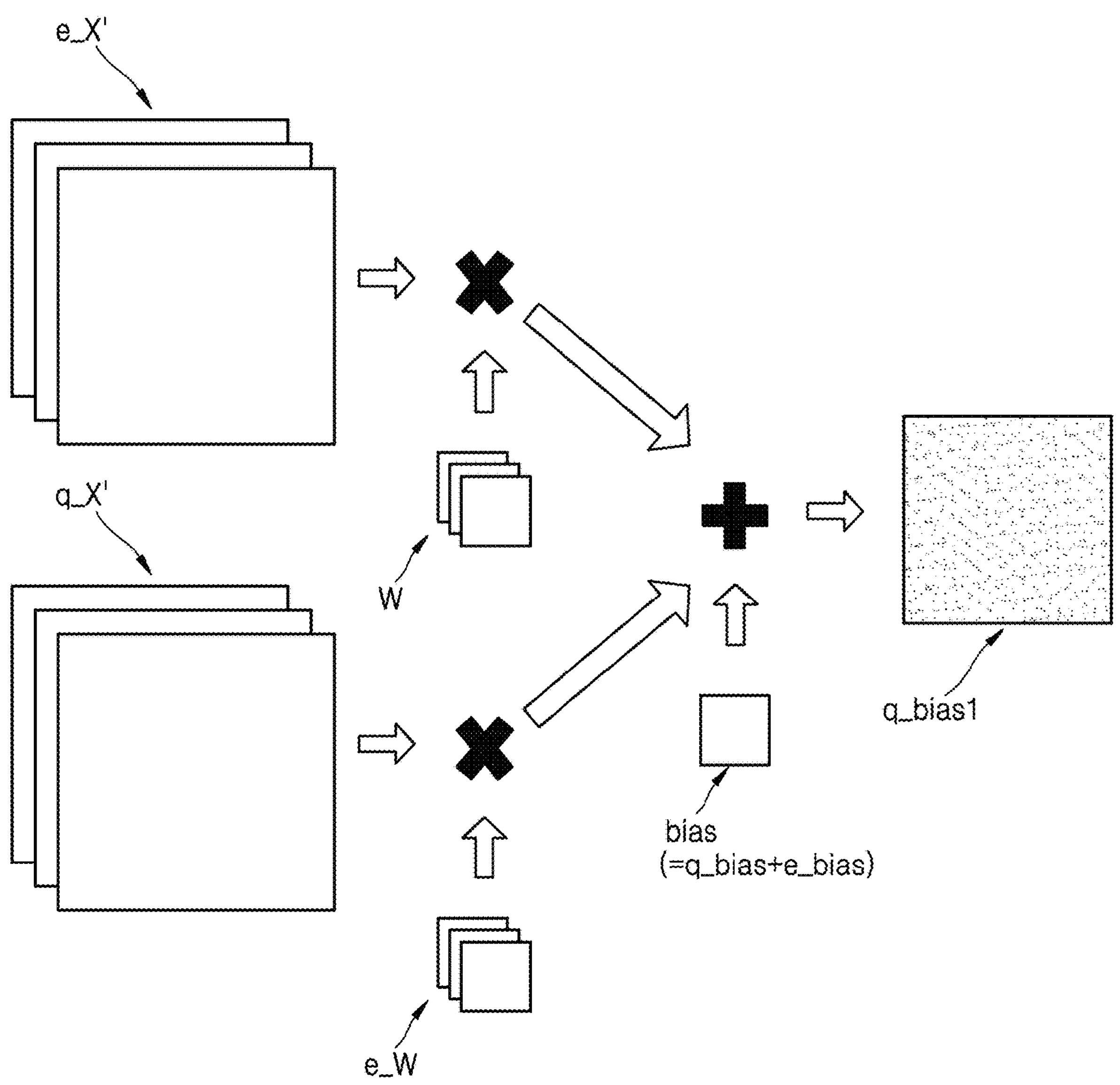
FIG. 7 is a diagram illustrating a method of generating a compensation bias according to example embodiments.

FIG. 7 is a diagram illustrating a method of generating the compensation bias q_bias1 according to example embodiments. For example, FIG. 7 is a diagram illustrating a modifiable example embodiment of FIG. 6.

The operation of the compensation bias of FIG. 6 may be expressed as the following equation.

$$\begin{aligned} q_{bias_{new}} &= \left\{q_{bias} + E\left[\sum_{c,k \in C,K} \{q_{w_{c,k}} e_{x_{c,k}} + e_{w_{c,k}} q_{x_{c,k}} + e_{w_{c,k}} e_{x_{c,k}}\} + e_{bias}\right]\right\} = \left\{q_{bias} + E\left[\sum_{c,k \in C,K} \{e_{w_{c,k}} q_{x_{c,k}} + e_{x_{c,k}} (q_{w_{c,k}} + e_{w_{c,k}})\} + e_{bias}\right]\right\} \\ &= \left\{q_{bias} + E\left[\sum_{c,k \in C,K} \{e_{w_{c,k}} q_{x_{c,k}} + e_{x_{c,k}} W_{c,k}\} + e_{bias}\right]\right\} \\ &= \left\{\text{bias} + E\left[\sum_{c,k \in C,K} \{e_{w_{c,k}} q_{x_{c,k}} + e_{x_{c,k}} W_{c,k}\}\right]\right\} \end{aligned} \quad \text{[Equation 4]}$$

In the last equation above, $W_{c,k}$ may mean the non-quantized weight W of an ANN. $q_{x_{c,k}}$ and $e_{x_{c,k}}$ may be generated using the reference sample X' rather than the actual input sample X. A method of determining the reference sample X', and a method of computing the quantized reference sample ($q_{x_{c,k}}$) and the quantization error ($e_{x_{c,k}}$) of the reference sample X' will be described later in FIGS. 9 and 13.

Referring to FIG. 7, the last expression above may be implemented by the operation of the bias compensator 140. The bias compensator 140 may perform a third MAC operation based on the quantization error e_X' of the reference sample X' and the non-quantized weight W. Also, the bias compensator 140 may perform a fourth MAC operation based on a quantized reference sample q_X' and the quantization error e_W of a weight. In addition, the bias compensator 140 may add a third MAC operation result, a fourth MAC operation result, and a bias of an ANN to generate the compensation bias q_bias1.

Methods of generating the compensation bias q_bias1 are different in FIGS. 6 and 7, but values thereof may be the same. The quantized input sample q_X of FIG. 5 and the reference sample X', the quantized reference sample q_X', and the quantization error e_X' of the reference sample X' of FIGS. 6 and 7 may have the same width W and height H. The quantized weight q_W of FIG. 5, the quantized weight q_W and the quantization error e_W of the weight of FIGS. 6 and 7 may have the same kernel size K. Accordingly, the size of the compensation bias q_bias1 generated in FIGS. 6 and 7 may be the same as the size of a MAC operation result of the quantized weight q_W and the quantized input sample q_X in a channel of FIG. 5. Accordingly, the generated compensation bias q_bias1 may be added to all values in a region overlapping the MAC operation result of the quantized weight q_W and the quantized input sample q_X.

Figure 8:
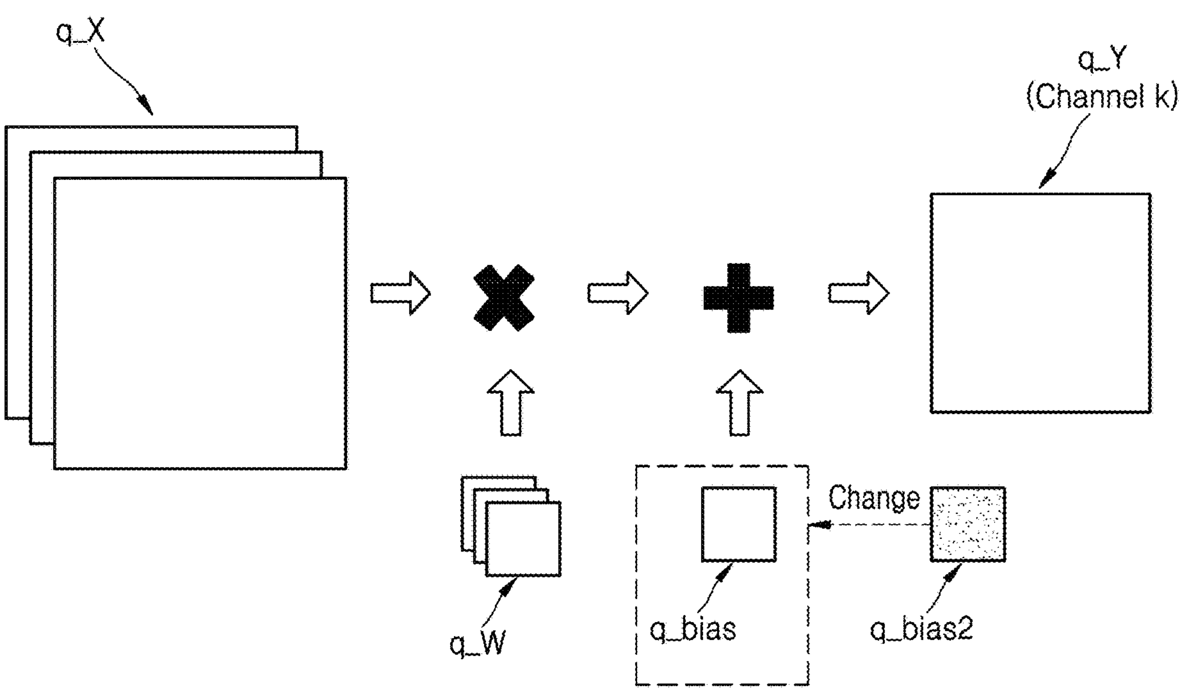
FIG. 8 is a diagram illustrating an operation of reflecting an expected value of a quantization error of a neural network system to a quantized operation according to example embodiments.

FIG. 8 is a diagram illustrating an operation of reflecting an expected value of a quantization error of the neural network system 200 to a quantized operation according to example embodiments. For example, FIG. 8 is a diagram illustrating a modifiable example embodiment of FIG. 5.

As described above in FIG. 7, the compensation bias q_bias1 may have the same size of a MAC operation result of the quantized weight q_W and the quantized input sample q_X in a channel. According to the modifiable example embodiment, the compensation bias q_bias1 may have a scalar value rather than a two-dimensional matrix structure. In example embodiments, the bias compensator 140 may generate a second compensation bias q_bias2 having the scalar value by obtaining the mean of values constituting the compensation bias q_bias1. A method performed by the bias compensator 140 of generating the second compensation bias q_bias2 having the scalar value is not limited to the above-described example, and various methods may be applied.

The bias compensator 140 may provide the generated second compensation bias q_bias2 to the neural network system 200. According to example embodiments, the bias compensator 140 may provide the compensation bias q_bias1 to the neural network system 200 and generate the second compensation bias q_bias2 having the scalar value using the compensation bias q_bias1 received by the neural network system 200.

Referring to FIG. 8, the neural network system 200 may perform a MAC operation based on the quantized input sample q_X and the quantized weight q_W. In addition, the neural network system 200 may generate the quantized output sample q_Y by reflecting the second compensation bias q_bias2 to the MAC operation result, instead of the quantized bias q_bias obtained by simply quantizing a bias of an ANN. As described above, when the second compensation bias q_bias2 is used instead of the compensation bias q_bias1, the efficiency of storage space of a memory may increase, and only one scalar value may be reflected to the MAC operation result, and thus the operation speed may increase.

Figure 9:
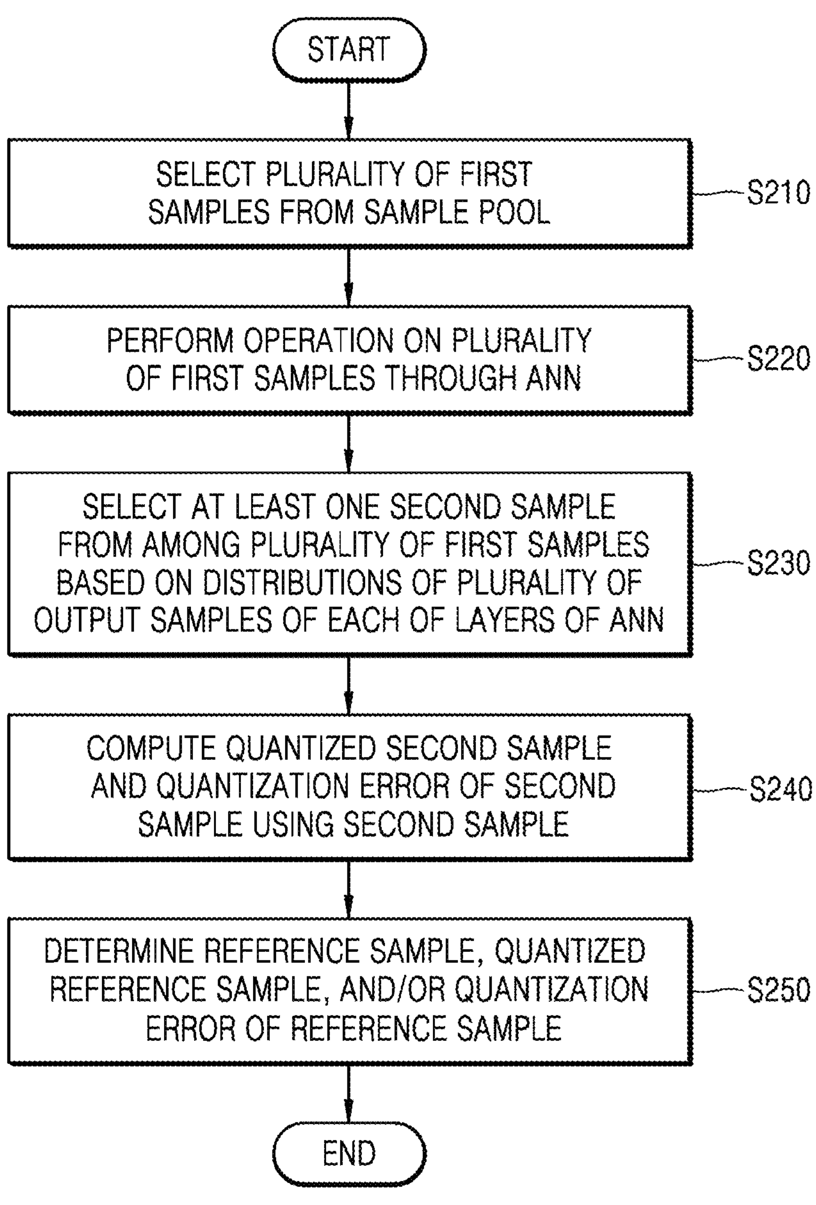
FIG. 9 is a flowchart illustrating a method of determining a reference sample, a quantized reference sample, and a quantization error of a reference sample according to example embodiments.

FIG. 9 is a flowchart illustrating a method of determining a reference sample, a quantized reference sample, and a quantization error of a reference sample according to example embodiments. For example, FIG. 9 is the flowchart illustrating the method of determining the reference sample, the quantized reference sample, and the quantization error of the reference sample to generate a compensation bias that may be fixedly used by the neural network system 200 and the quantization system 100 of FIG. 2.

Referring to FIGS. 2 and 9, the neural network system 200 may select a plurality of first samples from a sample pool (S210). Here, the plurality of first samples may be training samples used for training an ANN. However, the inventive concepts are not limited thereto, and the plurality of first samples may be samples not used for training of the ANN, and may include both training samples used for training and the samples not used for training.

In addition, the neural network system 200 may perform operations on the plurality of first samples through the ANN (S220). For example, the neural network system 200 may perform operations on the plurality of first samples through a non-quantized neural network.

In addition, the neural network system 200 may select at least one second sample from among the plurality of first samples based on statistical distributions of a plurality of output samples of each of layers constituting the ANN (S230). For example, the neural network system 200 may identify the statistical distributions of the output samples of the layers constituting a non-quantized ANN, for example, each of the first layer L1 to the nth layer Ln of FIG. 1. Here, the statistical distributions may include at least one of mean, variance, expected value, asymmetry, and kurtosis of the output samples, and are not limited to the above-described example. In addition, the neural network system 200 may select the at least one second sample from among the plurality of first samples based on the statistical distributions. For example, the neural network system 200 may select the at least one second sample corresponding to an output sample having a value close to the mean of each of the layers from among the plurality of first samples. A method of selecting the at least one second sample based on the statistical distributions is not limited to the above-described example.

Then, the neural network system 200 may compute a quantized second sample and a quantization error of the second sample using the selected second sample (S240). For example, the neural network system 200 may perform an operation on the second sample through the quantized ANN to compute the quantized second sample. Then, using the characteristic that the input sample X is equal to the quantized input sample q_X and the quantization error e_X of the input sample, the neural network system 200 may compute the quantization error of the second sample from the second sample and the quantized second sample.

In addition, the quantization system 100 may determine a reference sample, a quantized reference sample, and/or a quantization error of the reference sample (S250). In example embodiments, the quantization system 100 may compute the mean of each of the at least one second sample, the quantized second sample, and the quantization error of the second sample, and determine the computed mean of the second sample, mean of the quantized second sample, and mean of the quantization error of the second sample as the reference sample, the quantized reference sample, and the quantization error of the reference sample respectively. A method performed by the quantization system 100 of determining the reference sample, the quantized reference sample, and/or the quantization error of the reference sample using the quantization error of the second is not limited to the above-described example and various methods may be applied.

In addition, the quantization system 100 may generate a compensation bias based on the determined reference sample, quantized reference sample, and/or quantization error of the reference sample. For example, referring to FIG. 6, the bias compensator 140 of the quantization system 100 may perform a first MAC operation based on the quantization error e_X' of the reference sample and the quantized weight q_W. In addition, the bias compensator 140 may perform a second MAC operation based on the reference sample X' and the quantization error e_W of a weight. Then, the bias compensator 140 may add a first MAC operation result, a second MAC operation result, and a bias of the ANN (that is the same as the sum of the quantized bias q_bias and the quantization error e_bias of the bias) to generate the compensation bias q_bias1.

Alternatively, referring to FIG. 7, the bias compensator 140 of the quantization system 100 may perform a third MAC operation based on the quantization error e_X' of the reference sample and the non-quantized weight W. Also, the bias compensator 140 may perform a fourth MAC operation based on the quantized reference sample q_X' and the quantization error e_W of the weight. In addition, the bias compensator 140 may add a third MAC operation result, a fourth MAC operation result, and the bias of the ANN to generate the compensation bias q_bias1.

As described above with reference to FIG. 8, the bias compensator 140 may obtain the mean of values constituting the generated compensation bias q_bias1, thereby generating a second compensation bias q_bias2 having a scalar value.

As described above, the bias compensator 140 may determine the reference sample, the quantized reference sample, and/or the quantization error of the reference sample using a plurality of samples, and generate the compensation bias q_bias1 or q_bias2 based on the determined reference sample, quantized reference sample, and/or quantization error of the reference sample. The neural network system 200 may use the generated compensation bias q_bias1 or q_bias2 in the operation of the input sample. The inventive concepts are not limited thereto, and according to example embodiments, the bias compensator 140 may periodically or non-periodically generate a compensation bias.

The bias compensator 140 may determine the reference sample, the quantized reference sample, and he quantization error of the reference sample using already processed input samples. In this regard, detailed descriptions will be given later with reference to FIGS. 10 to 14.

Figure 10:
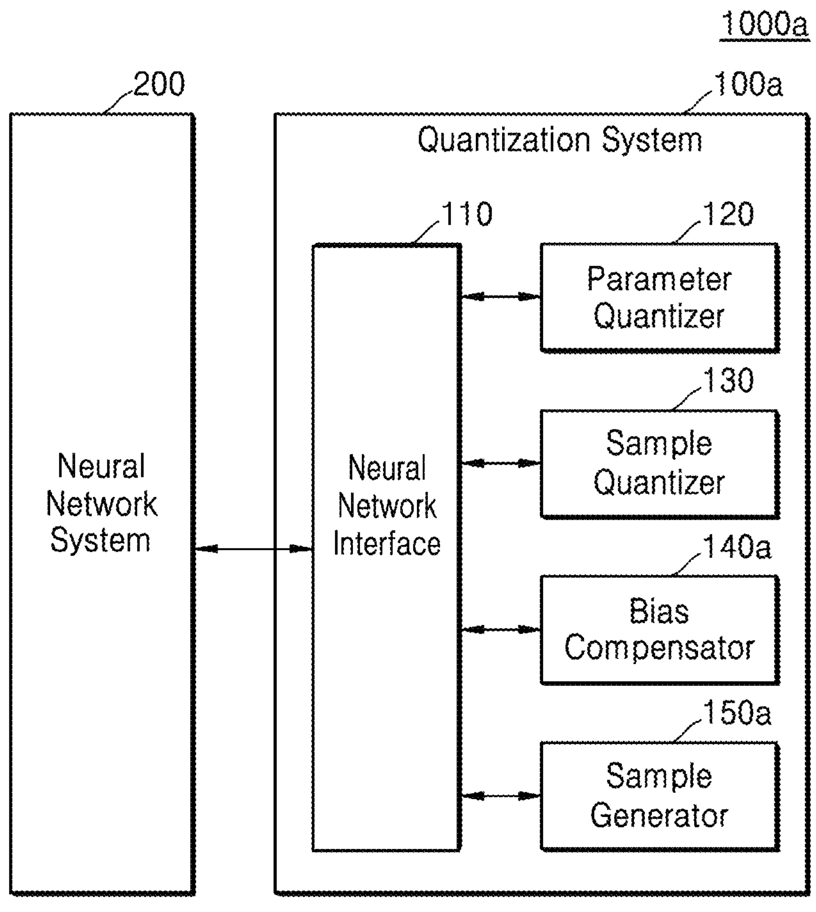
FIG. 10 is a diagram illustrating a computing system according to example embodiments.

FIG. 10 is a diagram illustrating a computing system 1000*a* according to example embodiments. For example, FIG. 10 is a diagram illustrating a modifiable example embodiment of FIG. 2.

Referring to FIG. 10, the computing system 1000*a* may include a quantization system 100*a* and the neural network system 200. The quantization system 100*a* may generate the neural network interface 110, the parameter quantizer 120, the sample quantizer 130, a bias compensator 140*a*, and a sample generator 150*a*. The neural network system 200, the neural network interface 110, the parameter quantizer 120, and the sample quantizer 130 according to example embodiments of FIG. 10 may correspond to the neural network system 200, the neural network interface 110, the parameter quantizer 120, and the sample quantizer 130 of FIG. 1, and thus redundant descriptions thereof are omitted.

The sample generator 150*a* may be implemented in processing circuitry, for example, a logic block implemented through logic synthesis, a software block executed by a processor, or a combination thereof. With reference to FIG. 10, although the sample generator 150*a* is illustrated and described as being included in the quantization system 100*a*, according to example embodiments, the sample generator 150*a* may be included in the neural network system 200 or may be implemented in a separate configuration from the neural network system 200 and the quantization system 100*a*.

The sample generator 150*a* may generate an input sample of a next order that is expected using at least one input sample already processed by the neural network system 200. For example, the sample generator 150*a* may analyze the already processed at least one input sample, and expect the input sample of the next order according to an analysis result. In addition, the sample generator 150*a* may provide the expected input sample to the bias compensator 140*a*. A detailed description of the operation performed by the sample generator 150*a* of generating the input sample of the next order expected using the already processed at least one input sample will be given later with reference to FIGS. 11 and 12.

The bias compensator 140*a* may generate a compensation bias using the received expected input sample. A specific method performed by the bias compensator 140*a* of generating the compensation bias using the expected input sample will be described later in FIG. 11.

Figure 11:
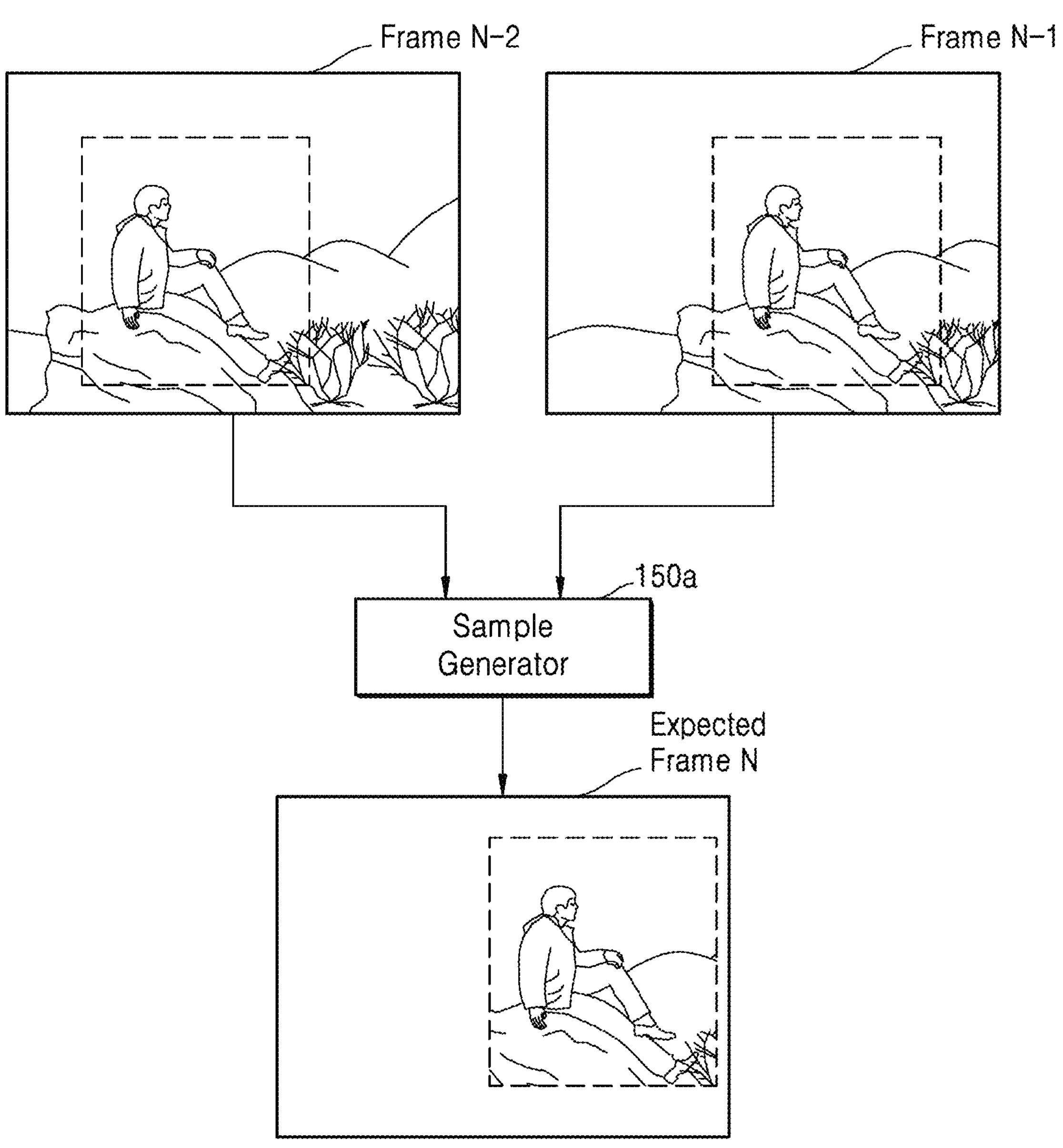
FIG. 11 is a diagram illustrating a method of expecting a next input sample according to example embodiments.

FIG. 11 is a diagram illustrating a method of expecting a next input sample according to an embodiment. For example, FIG. 11 is a diagram illustrating a method performed by the sample generator 150*a* of FIG. 10 of expecting an input sample of a next order using at least one already processed input sample.

Input samples processed by the neural network system 200 may be images continuously photographed. Each of the continuously photographed images has a small difference from an image in a previous order or a subsequent order, and a difference between images may have directionality over time. Accordingly, the sample generator 150*a* may expect the input sample of the next order by analyzing a difference between input samples that have already been processed, for example, the continuously photographed images. In addition, the sample generator 150*a* may provide the input sample of the next order that is expected to the bias compensator 140*a*. The sample generator 150*a* may read the input samples already processed from a memory (not shown) included in the quantization system 100*a*, or receive the already processed input samples from the neural network system 200 or any other distinct configuration.

For example, referring to FIG. 11, the sample generator 150*a* may compute motion vectors of an N−2th frame and an N−1th frame which are the most recent images among the already processed images using a Kalman filter, etc. In addition, the sample generator 150*a* may identify an object (e.g., a person) moving in an image using the computed motion vectors. In addition, the sample generator 150*a* may generate an expected Nth frame by expecting a movement path in the image of the identified object.

With reference to FIG. 11, although the sample generator 150*a* is illustrated and described as expecting the next image using two recent images, the inventive concepts are not limited thereto, and two or more recent images may be used to expect the next image.

Figure 12:
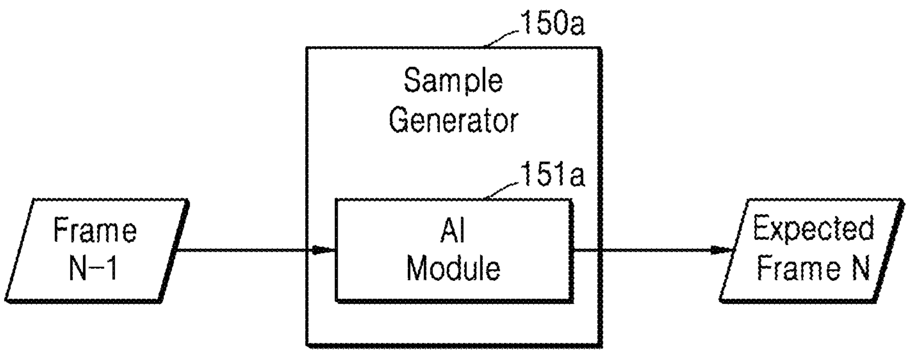
FIG. 12 is a diagram illustrating a method of expecting a next input sample according to example embodiments.

FIG. 12 is a diagram illustrating a method of expecting a next input sample according to example embodiments. For example, FIG. 12 is a diagram illustrating a method performed by the sample generator 150*a* of FIG. 10 of expecting an input sample of a next order using at least one already processed input sample.

The sample generator 150*a* may include an artificial intelligence (AI) module 151*a*. The AI module 151*a* may be an AI module trained to expect the next sample based on the input sample. The sample generator 150*a* may input the at least one already processed input sample to the AI module 151*a*, and provide an output sample output from the AI module 151 to the bias compensator 140*a* as the next input sample. The AI module 151*a* may be implemented as a logic block implemented through logic synthesis, a software block performed by a processor, or a combination thereof.

With reference to FIGS. 11 and 12, input samples processed by the neural network system 200 are described as being continuously photographed images, but the inventive concepts are not limited thereto, and various kinds of data such as voice data or depth data may be used.

Figure 13:
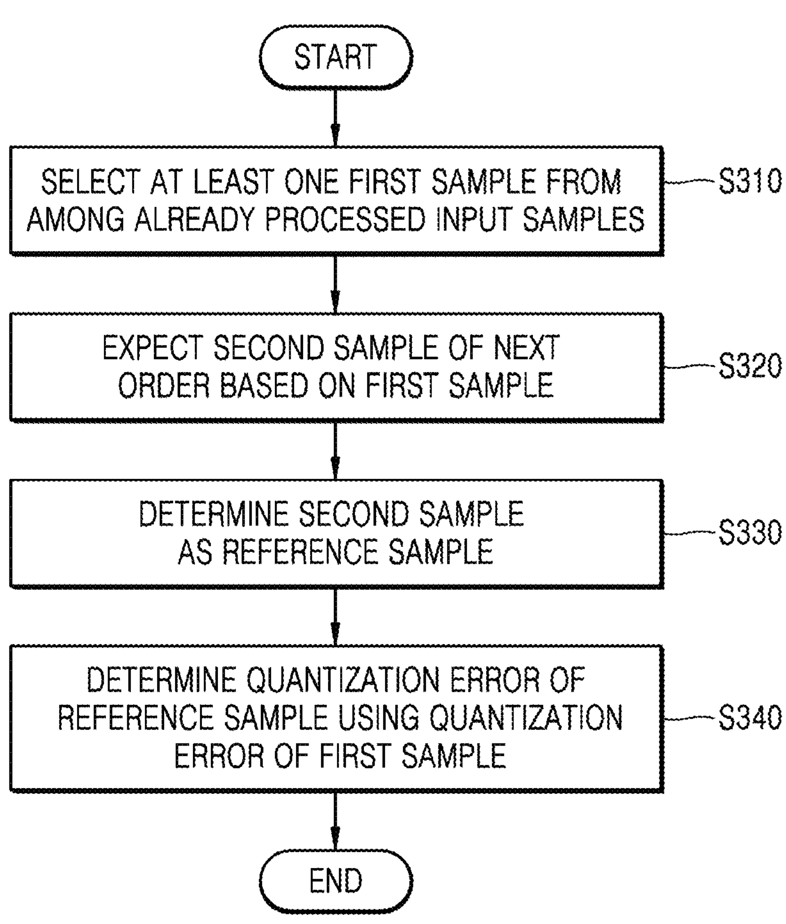
FIG. 13 is a flowchart illustrating a method of determining a reference sample, a quantized reference sample, and a quantization error of the reference sample according to example embodiments.

FIG. 13 is a flowchart illustrating a method of determining a reference sample, a quantized reference sample, and a quantization error of the reference sample according to example embodiments. Specifically, FIG. 13 is the flowchart illustrating the method of determining the reference sample, the quantized reference sample, and the quantization error of the reference sample to generate a compensation bias that the neural network system 200 and the quantization system 100*a* of FIG. 10 may use in the operation of an input sample of a next order.

Referring to FIGS. 10 and 13, the quantization system 100*a* may select at least one first sample from among already processed input samples (S310). For example, the sample generator 150*a* of the quantization system 100*a* may select a preset number of first samples from among the already processed input samples. Here, the preset number may be set by a manufacturer or a user. For example, the sample generator 150*a* may select 100 recently processed images as the first samples from among already processed consecutive images when the input samples are consecutively photographed images.

In addition, the quantization system 100*a* may expect a second sample of a next order based on the first sample (S320). For example, the sample generator 150*a* may analyze the preset number of first samples, and may expect the second sample of the next order according to an analysis result. The method performed by the sample generator 150*a* of expecting the second sample of the next order may be the same or substantially the same as the method described in FIGS. 11 and 12. In addition, the sample generator 150*a* may provide the second sample to the bias compensator 140*a*.

Then, the quantization system 100*a* may determine the expected second sample as the reference sample (S330). Then, the quantization system 100*a* may determine the quantization error of the reference sample using a quantization error of the at least one first sample (S340). In example embodiments, the bias compensator 140*a* may determine the quantization error of the reference sample by obtaining the mean of the quantization errors of the at least one first sample. Alternatively, the bias compensator 140*a* may identify a quantization error of the most recently processed sample among the at least one first sample, and determine the identified quantization error as the quantization error of the reference sample. That is, the bias compensator 140*a* may determine the quantization error of the reference sample without using the characteristic that the input sample X is the same as the quantized input sample q_X and the quantization error e_X of the input sample X.

In addition, the quantization system 100*a* may generate a compensation bias based on the determined reference sample and quantization error of the reference sample. For example, referring to FIG. 6, the bias compensator 140*a* of the quantization system 100*a* may perform a first MAC operation based on the quantization error e_X' of the reference sample and the quantized weight q_W. In addition, the bias compensator 140*a* may perform a second MAC operation based on the reference sample X' and the quantization error e_W of the weight. In addition, the bias compensator 140*a* may add a first MAC operation result, a second MAC operation result, and a bias of an ANN (that is the same as the sum of the quantized bias q_bias and the quantization error e_bias of the bias) to generate the compensation bias q_bias1.

According to a modifiable example embodiment, the quantization system 100*a* may quantize the determined reference sample and generate the compensation bias based on the quantized reference sample and the quantization error of the reference sample. For example, referring to FIG. 7, the bias compensator 140*a* of the quantization system 100*a* may perform a third MAC operation based on the quantization error e_X' of the reference sample and the non-quantized weight W. In addition, the bias compensator 140*a* may perform a fourth MAC operation based on the quantized reference sample q_X' and the quantization error e_W of the weight. In addition, the bias compensator 140*a* may add a third MAC operation result, a fourth MAC operation result, and the bias of the ANN to generate the compensation bias q_bias1.

As described above with reference to FIG. 8, the bias compensator 140*a* may generate the second compensation bias q_bias2 having a scalar value by obtaining the mean of values constituting the generated compensation bias q_bias1.

As described above, the bias compensator 140*a* may determine the reference sample, the quantized reference sample, and/or the quantization error of the reference sample using the input samples that have already been processed, and generate the second compensation q_bias1 or bias q_bias2 based on the determined reference sample, quantized reference sample, and quantization error of the reference sample. The neural network system 200 may use the generated compensation bias q_bias1 or bias q_bias2 in the operation of an input sample of a next order.

Figure 14:
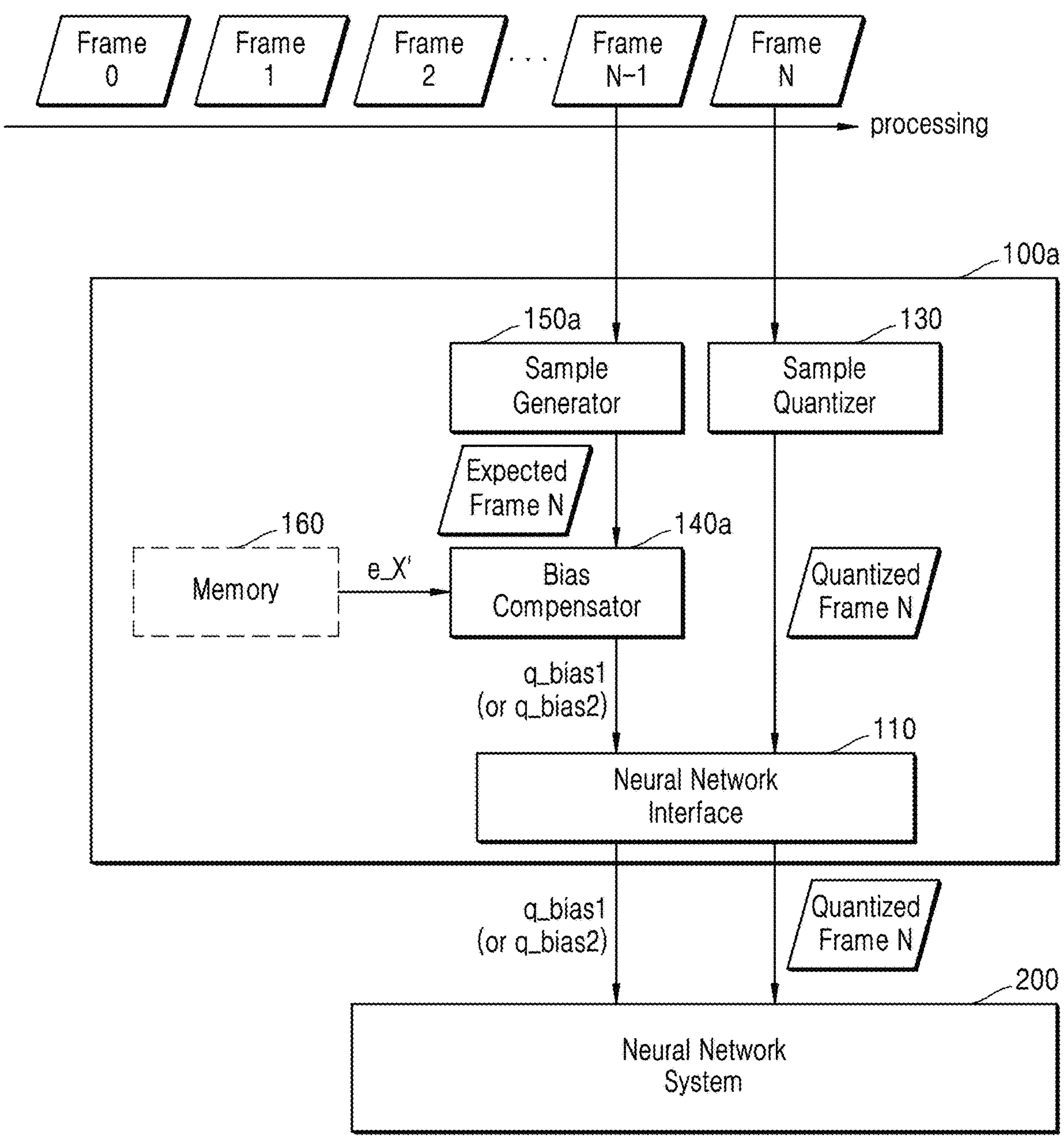
FIG. 14 is a diagram illustrating a method of performing an operation on an input sample of a next order through a quantized artificial neural network (ANN) according to example embodiments.

FIG. 14 is a diagram illustrating a method of performing an operation on an input sample of a next order through a quantized ANN according to example embodiments. For example, FIG. 14 is the diagram illustrating the method performed by the quantization system 100*a* and the neural network system 200 of FIG. 10 of performing operations on the input sample of the next order. Hereinafter, for convenience of description, description will be given on the assumption that input samples are continuously photographed images.

Referring to FIGS. 10 and 14, consecutively photographed images Frame 0 to Frame N that are a plurality of input samples may be sequentially processed. When processing on a frame N−1 is completed, the quantization system 100*a* may prepare for processing on a frame N.

For example, the quantization system 100*a* may select at least one image from among the already processed images Frame 0 to Frame N−1. For example, referring to FIG. 14, the sample generator 150*a* of the quantization system 100*a* may select the frame N−1. In addition, the quantization system 100*a* may expect an image of the next order based on the selected image. For example, referring to FIG. 14, the sample generator 150*a* may expect the frame N based on the frame N−1 to generate an expected frame N.

In addition, the quantization system 100*a* may generate a compensation bias using the image of the next order. For example, referring to FIG. 14, the bias compensator 140*a* may receive the expected frame N from the sample generator 150*a*, and determine the received expected frame N as the reference sample X'. In addition, the bias compensator 140*a* may determine the quantization error e_X' of the reference sample using a quantization error of at least one of the already processed images Frame 0 to Frame N−1. In example embodiments, the bias compensator 140*a* may determine a quantization error of the frame N−1 as the quantization error e_X' of the reference sample, or determine the quantization error e_X' of the reference sample by obtaining the mean of quantization errors of a preset number of most recently processed images.

Quantization errors of the already processed images Frame 0 to Frame N−1 may be computed in a previous operation process on the already processed images Frame 0 to Frame N−1 and stored in the memory 160. For example, using the characteristic that the input sample X is the same as the quantized input sample q_X and the quantization error e_X of the input sample, the quantization errors of the already processed images Frame 0 to Frame N−1 may be computed and stored in the memory 160. Accordingly, the bias compensator 140*a* may read the quantization error of at least one of the already processed images Frame 0 to Frame N−1 from the memory 160, and determine the quantization error e_X' of the reference sample using the read error. In FIG. 14, although the memory 160 is illustrated and described as being included in the quantization system 100*a*, the memory 160 may be included in the neural network system 200 or may be implemented in a separate configuration from the neural network system 200 and the quantization system 100*a*.

In addition, the bias compensator 140*a* may generate the compensation bias q_bias1 or q_bias2 based on the reference sample X' and the quantization error e_X' of the reference sample X'. In addition, the bias compensator 140*a* may provide the generated compensation bias q_bias1 or q_bias2 to the neural network system 200 through the neural network interface 110.

Then, the sample quantizer 130 may quantize the frame N to generate a quantized frame N. Also, the sample quantizer 130 may provide the quantized frame N to the neural network system 200 through the neural network interface 110.

In addition, the neural network system 200 may perform an operation based on the received quantized frame N and the compensation bias q_bias1 or q_bias2. For example, the neural network system 200 may perform the MAC operation based on the quantized frame N and a quantized weight, and reflect the compensation bias q_bias1 or q_bias2 to a MAC operation result to generate the quantized output sample q_Y.

Figure 15:
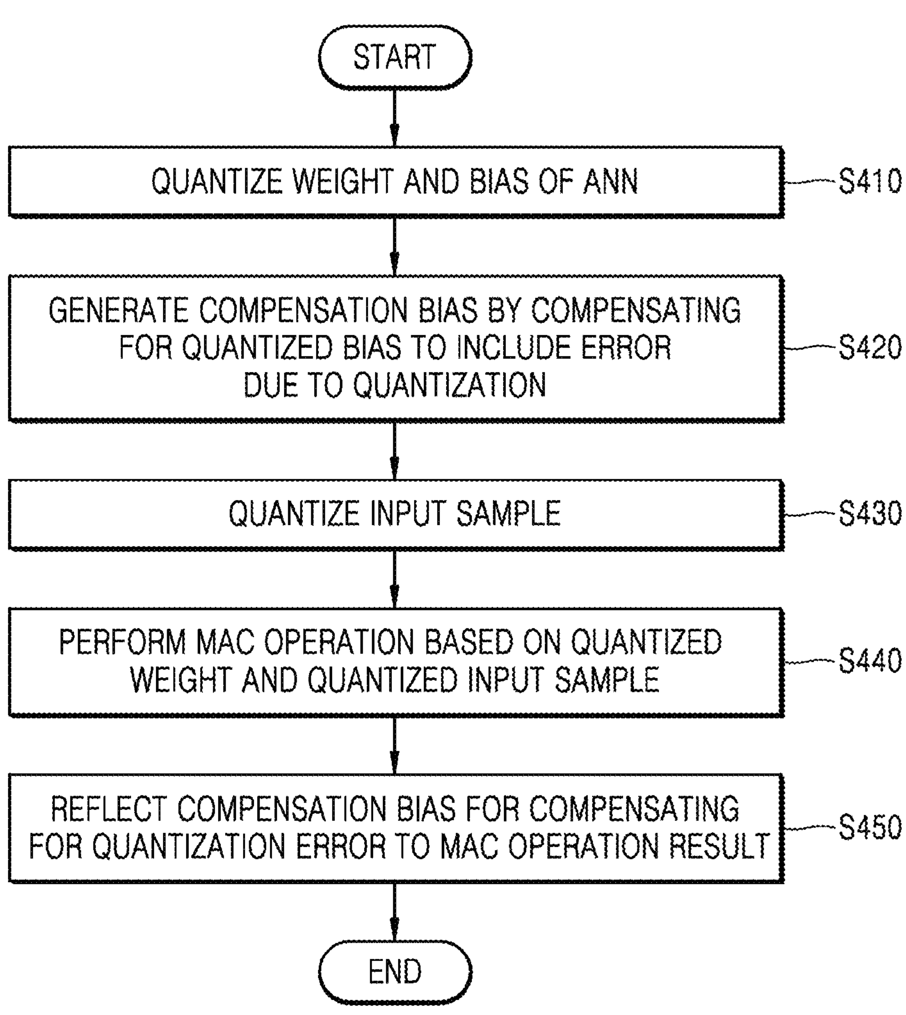
FIG. 15 is a flowchart illustrating an operation method using an ANN according to example embodiments.

FIG. 15 is a flowchart illustrating an operation method using an ANN according to an embodiment. For example, FIG. 15 is the flowchart illustrating the operation method using the ANN of the computing system 1000 or 1000*a* of FIG. 2 or 10.

Referring to FIGS. 2, 10 and 15, the computing system 1000 or 1000*a* may quantize parameters of the ANN (S410). For example, the quantization system 100 or 100*a* of the computing system 1000 or 1000*a* may quantize the parameters of the ANN such as a weight and a bias. In addition, the computing system 1000 or 1000*a* may generate a compensation bias by compensating for the quantized bias to include an error due to quantization (S420). Here, the compensation bias may be generated using at least one of a quantized weight of the ANN, a quantization error of the weight, the quantized bias, a quantization error of the bias, a reference sample, a quantized reference sample, and a quantization error of the reference sample. The reference sample may be determined through a plurality of samples different from an input sample currently being processed, or may be determined through at least one of input samples that have already been processed.

Further, the computing system 1000 or 1000*a* may quantize the input sample (S430). For example, the quantization system 100 or 100*a* of the computing system 1000 or 1000*a* may quantize the input sample. In addition, the quantization system 100 or 100*a* may provide the quantized input sample to the neural network system 200 of the computer system 1000 or 1000*a*. Also, the computing system 1000 or 1000*a* may perform a MAC operation based on the quantized weight and the quantized input sample (S440). For example, the neural network system 200 may receive the quantized input sample and perform the MAC operation based on the quantized weight and the received quantized input sample.

In addition, the computing system 1000 or 1000*a* may reflect the compensation bias for compensating for the quantization error to a MAC operation result (S450). For example, the neural network system 200 of the computing system 1000 or 1000*a* may generate a final operation result by reflecting the compensation bias received from the quantization system 100 or 100*a* to the MAC operation result. The computing system according to example embodiments may generate an expected value of an error occurring in a quantization process as a compensation bias, and reflect the generated compensation bias to a MAC operation result through a quantized ANN. Accordingly, the operation method using the ANN according to example embodiments may have a reduced complexity owing to the use of the quantized ANN and have good performance according to the reflection of the compensation bias.

Figure 16:
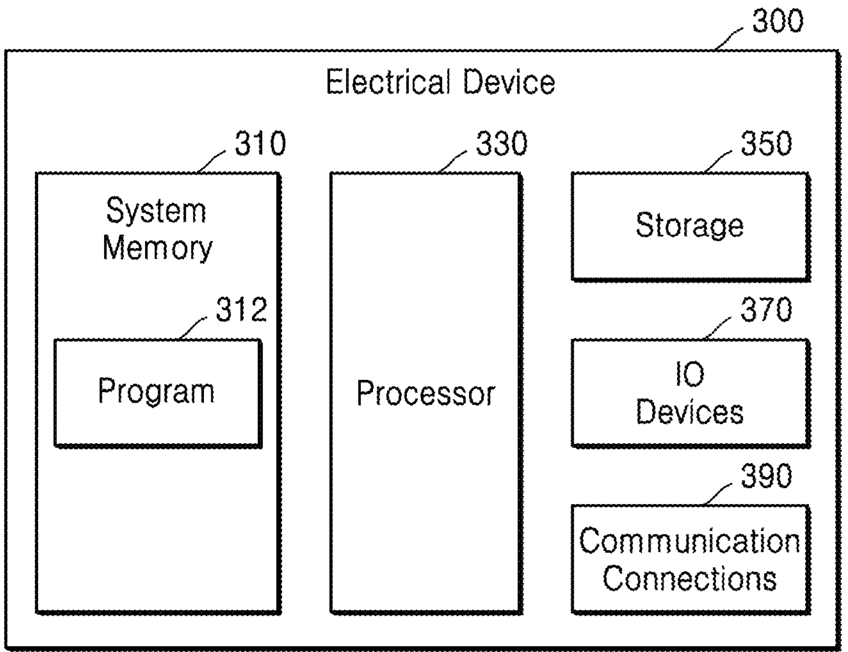
FIG. 16 is a block diagram illustrating an electronic device according to example embodiments.

FIG. 16 is a block diagram illustrating an electronic device 300 according to example embodiments.

In example embodiments, the quantization system 100 or 100*a* of FIG. 2 or 10 may be implemented as the electronic device 300 of FIG. 16. As shown in FIG. 16, the electronic device 300 may include a system memory 310, a processor 330, storage 350, input/output (I/O) devices 370, and/or communication connections 390. Components included in the electronic device 300 may be communicatively connected to each other, for example, through a bus.

The system memory 310 may include a program 312. The program 312 may cause the processor 330 to perform quantization of an ANN according to example embodiments, quantization of an input sample, and generation of a compensation bias. For example, the program 312 may include a plurality of instructions executable by the processor 330. Further, the plurality of instructions included in the program 312 may be executed by the processor 330 to perform quantization of the ANN, quantization of the input sample, or generation of the compensation bias. The system memory 310 may include, as a non-limiting example, volatile memory such as static random access memory (SRAM) and dynamic random access memory (DRAM), or non-volatile memory such as flash memory.

The processor 330 may include at least one core that may execute any instruction set (e.g., Intel Architecture-32 (IA-32), 64-bit extensions IA-32, x86-64, PowerPC, Sparc, MIPS, ARM, IA-64, etc.) The processor 330 may execute instructions stored in the system memory 310, and execute the program 312 to perform quantization of the ANN, quantization of the input sample, or generation of the compensation bias.

The storage 350 may not lose stored data even if power supplied to the electronic device 300 is blocked. For example, the storage 350 may also include a non-volatile memory such as a Electrically Erasable Programmable Read-Only Memory (EEPROM), flash memory, Phase Change Random Access Memory (PRAM), Resistance Random Access Memory (RRAM), Nano Floating Gate Memory (NFGM), Polymer Random Access Memory (PoRAM), Magnetic Random Access Memory (MRAM), Ferroelectric Random Access Memory (FRAM), etc. and a storage medium such as a magnetic tape, optical disc, and magnetic disc. In some example embodiments, the storage 350 may be removable from the electronic device 300.

In example embodiments, the storage 350 may store the program 312 for quantization of the ANN according to example embodiments, quantization of the input sample, and generation of the compensation bias. And before the program 312 is executed by the processor 330, the program 312 or at least part thereof may be loaded into the system memory 310 from the storage 350. In example embodiments, the storage 350 may store a file written in a programming language, and the program 312 generated by a compiler or the like or at least part thereof may be loaded into the system memory 310 from the file.

In example embodiments, the storage 350 may store data to be processed by the processor 330 and/or data processed by the processor 330. For example, the storage 350 may store input samples, store quantized input samples and quantization errors of the input samples, and store the generated compensation bias, etc.

The I/O devices 370 may include an input device such as a keyboard and pointing device, and may include an output device such as a display device and a printer. For example, a user may trigger execution of the program 312 by the processor 330 through the I/O devices 370, may input the input sample, and identify an output sample and/or an error message, etc.

The communication connections 390 may provide access to a network outside the electronic device 300. For example, the network may include multiple computing systems and communication links, and the communication links may include wired links, optical links, wireless links, or any other form of links.

Figure 17:
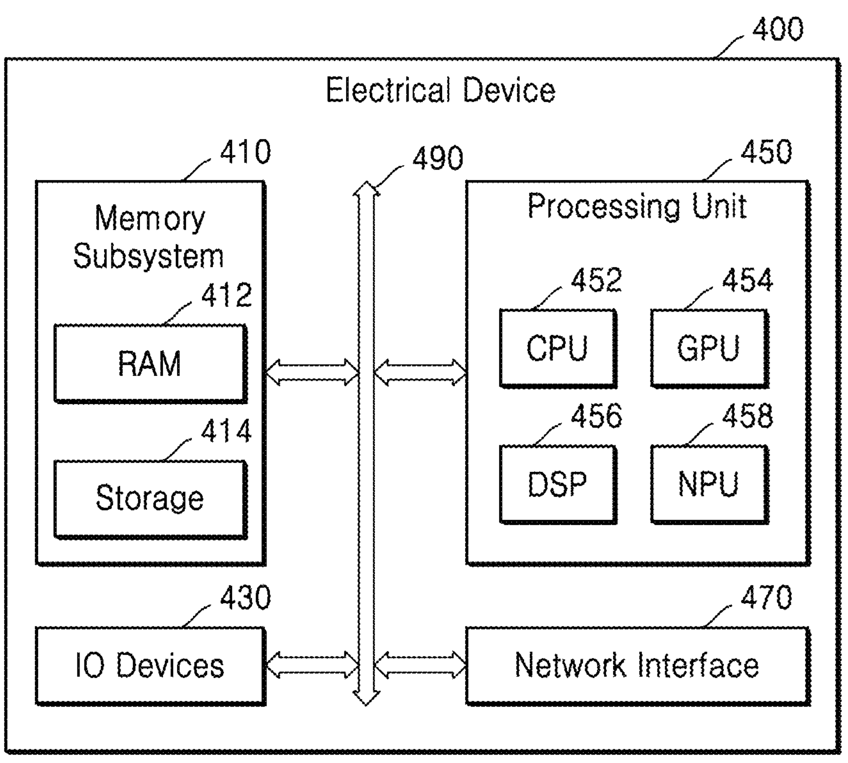
FIG. 17 is a block diagram illustrating an electronic device according to example embodiments.

FIG. 17 is a block diagram illustrating an electronic device 400 according to example embodiments. In example embodiments, the neural network system 200 of FIG. 2 or 10 may be implemented as the electronic device 400 of FIG. 17. The electronic device 400 may be, as a non-limiting example, any mobile electronic device that is powered by a battery or self-generation, such as a mobile phone, a tablet PC, a wearable device, an Internet of Things device, etc.

As shown in FIG. 17, the electronic device 400 may include a memory subsystem 410, I/O devices 430, a processing unit 450 and/or a network interface 470, and the memory subsystem 410, the I/O devices 430, the processing unit 450 and/or the network interface 470 may communicate with each other through a bus 490. In some example embodiments, at least two of the memory subsystem 410, the I/O devices 430, the processing unit 450 and the network interface 470 may be included in one package as a system-on-a-chip (SoC).

The memory subsystem 410 may include RAM 412 and storage 414. The RAM 412 and/or the storage 414 may store instructions executed and data to be processed by the processing unit 450. For example, the RAM 412 and/or the storage 414 may store parameters such as signals, weights, and biases of an ANN. In some example embodiments, the storage 414 may include non-volatile memory.

The processing unit 450 may include a central processing unit (CPU) 452, a graphics processing unit (GPU) 454, a digital signal processor (DSP) 456, and a neural processing unit (NPU) 458. Differently from that shown in FIG. 17, in example embodiments, the processing unit 450 may include only at least some of the CPU 452, the GPU 454, the DSP 456, and the NPU 458.

The CPU 452 may directly perform the overall operation of the electronic device 400, for example, a specific task in response to an external input received through the I/O devices 430, or may instruct other components of the processing unit 450 to perform the overall operation. The GPU 454 may generate data for an image output through a display device included in the I/O devices 430 or may encode data received from a camera included in the I/O devices 430. The DSP 456 may generate useful data by processing a digital signal, such as a digital signal provided from the network interface 470.

The NPU 458 which is dedicated hardware for the ANN, and may include a plurality of computational nodes corresponding to at least some artificial neurons constituting the ANN, and at least some of the plurality of computational nodes may process signals in parallel. Because the ANN quantized according to example embodiments has a higher accuracy and/or a lower computational complexity, the ANN may be easily implemented in the electronic device 400 of FIG. 17, may have a fast processing speed, and, for example, may be implemented by the small-scale NPU 458.

The I/O devices 430 may include input devices such as a touch input device, a sound input device, a camera, and output devices such as a display device and a sound output device. For example, when user's speech is input through a sound input device, the speech may be recognized by the ANN implemented in the electronic device 400, and an operation accordingly may be triggered. In addition, when an image is input through the camera, an object included in the image may be recognized by a DNN implemented in the electronic device 400, and an output such as virtual reality may be provided to the user. The network interface 470 may provide the electronic device 400 with access to a mobile communication network such as Long Term Evolution (LTE), 5G, etc. or may provide access to a local network such as Wi-Fi.

Any of the elements disclosed above, including the neural network system and/or the quantization system may include or be implemented in processing circuitry which may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In some embodiments, the artificial neural network ANN may include organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM).

Alternatively or additionally, the artificial neural network ANN may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests. Such machine learning models may also be used to provide various services and/or applications, e.g., an image classify service, a user authentication service based on bio-information or biometric data, an advanced driver assistance system (ADAS) service, a voice assistant service, an automatic speech recognition (ASR) service, or the like, may be performed, executed or processed by electronic devices.

While the inventive concepts have been particularly shown and described with reference to example embodiments thereof, it will be understood that various changes in form and details may be made therein without departing from the spirit and scope of the following claims.

What is claimed is:

1. A computing system comprising:

a neural network system configured to drive an artificial neural network (ANN); and a quantization system configured to quantize the ANN, wherein the quantization system is configured to quantize parameters of the ANN to generate quantized parameters of the ANN, generate a quantization error of the parameters of the ANN based on the parameters of the ANN and the quantized parameters, generate a compensation bias based on the quantized parameters and the quantization error of the parameters of the ANN, and transmit the quantized parameters and the compensation bias to the neural network system, wherein the parameters of the ANN comprise a weight and a bias of the ANN and the quantized parameters include a quantized weight and a quantized bias, wherein the compensation bias is based on a result of at least one of a second multiply-accumulate (MAC) operation or a result of a third MAC operation, wherein the second MAC operation includes a reference sample and a quantization error of the weight as inputs and the third MAC operation includes a quantization error of the reference sample and the quantized weight as inputs, and wherein the neural network system is configured to receive a quantized input sample, receive the quantized parameters transmitted from the quantization system, receive the generated compensation bias transmitted from the quantization system, perform a first MAC operation based on the quantized input sample and the quantized parameters as inputs to the ANN, and generate a final operation result by applying the compensation bias to a result of the first MAC operation.

2. The computing system of claim 1, wherein the quantization system is further configured to, upon receipt of an input sample from the neural network system, quantize the input sample to generate the quantized input sample and transmit the quantized input sample to the neural network system.

3. The computing system of claim 1, wherein the quantization error of the parameters comprises the quantization error of the weight and a quantization error of the bias.

4. The computing system of claim 3, wherein the quantization system is further configured to identify the reference sample so as to generate the compensation bias, quantize the reference sample to generate a quantized reference sample, and generate the quantization error of the reference sample based on the reference sample and the quantized reference sample.

5. The computing system of claim 4, wherein the quantization system is further configured to perform the second MAC operation, to perform the third MAC operation, and to generate the compensation bias based on the result of the second MAC operation and the result of the third MAC operation.

6. The computing system of claim 5, wherein the quantization system is further configured to sum the result of the second MAC operation, the result of the third MAC operation, and the bias of the ANN to generate the compensation bias.

7. The computing system of claim 6, wherein the quantization system is further configured to compute an average value of a result of the summing and generate the compensation bias having the computed average value as a scalar value.

8. The computing system of claim 4, wherein the quantization system is further configured to perform a fourth MAC operation based on the quantized reference sample and the quantization error of the weight, perform a fifth MAC operation based on the quantization error of the reference sample and the weight of the ANN, and generate the compensation bias based on a result of the fourth MAC operation and a result of the fifth MAC operation.

9. The computing system of claim 4, wherein the neural network system is further configured to select at least one first sample from a sample pool, and transmit the at least one first sample to the quantization system, and wherein the quantization system is further configured to generate the reference sample based on the at least one first sample, quantize the at least one first sample to generate a quantized at least one first sample, and generate the quantized reference sample using the quantized at least one first sample.

10. The computing system of claim 9, wherein the neural network system is further configured to select a plurality of second samples from the sample pool, perform an operation on the plurality of second samples through the ANN, and select the at least one first sample based on a result of the operation.

11. The computing system of claim 10, wherein the neural network system is further configured to identify statistical distributions of output samples of each of layers constituting the ANN based on the result of the operation, and select the at least one first sample based on the identified statistical distributions.

12. The computing system of claim 3, wherein the quantization system is further configured to expect a sample of a next order based on at least one third sample processed by the neural network system based on the quantized parameters to generate an expected input sample, generate a quantization error of the expected input sample based on a quantization error of the at least one third sample, and generate the compensation bias based on the expected input sample, the quantization error of the expected input sample, the quantized parameters, and the quantization error of the parameters of the ANN.

13. The computing system of claim 12, wherein the quantization system is further configured to compute a motion vector of the at least one third sample, and generate the expected input sample using the computed motion vector.

14. An operation method performed using an artificial neural network (ANN), the operation method comprising:

quantizing a weight and a bias of the ANN to generate a quantized weight and a quantized bias;

generating a compensation bias by compensating the quantized bias to comprise an error due to quantization;

quantizing an input sample;

performing a first multiply-accumulate (MAC) operation based on the quantized weight of the ANN and the quantized input sample as inputs to the ANN; and applying the compensation bias to a result of the first MAC operation, wherein the compensation bias is based on a result of at least one of a second MAC operation or a result of a third MAC operation, and the second MAC operation includes a reference sample and a quantization error of the weight as inputs and the third MAC operation includes a quantization error of the reference sample and the quantized weight as inputs.

15. The operation method of claim 14, wherein the generating of the compensation bias comprises compensating for the quantized bias based on a first error defined as the quantization error of the reference sample and a second error defined as the quantization error of the weight.

16. The operation method of claim 15, wherein the generating of the compensation bias comprises:

performing the second MAC operation;

performing the third MAC operation; and compensating for the quantized bias based on the result of the second MAC operation and the result of the third MAC operation.

17. The operation method of claim 16, wherein the compensating for the quantized bias based on the result of the second MAC operation and the result of the third MAC operation comprises:

summing the result of the second MAC operation, the result of the third MAC operation, and the bias of the ANN; and compensating for the quantized bias to comprise a result of the summing.

18. The operation method of claim 17, wherein the compensating for the quantized bias to comprise the result of the summing comprises:

computing an average value of the result of the summing; and compensating for the quantized bias to have the computed average value as a scalar value.

19. The operation method of claim 15, wherein the generating of the compensation bias comprises:

performing a fourth MAC operation based on the weight and the first error;

quantizing the reference sample;

performing a fifth MAC operation based on the quantized reference sample and the quantized error of the weight; and compensating for the quantized bias based on a result of the fourth MAC operation and a result of the fifth MAC operation.

* * * * *